US006009475A

United States Patent [19]
Shrader

[11] Patent Number: 6,009,475
[45] Date of Patent: Dec. 28, 1999

[54] FILTER RULE VALIDATION AND ADMINISTRATION FOR FIREWALLS

[75] Inventor: Theodore Jack London Shrader, Cedar Park, Tex.

[73] Assignee: International Business Machines Corporation, Armonk, N.Y.

[21] Appl. No.: 08/773,543

[22] Filed: Dec. 23, 1996

[51] Int. Cl.⁶ ............................ G06F 11/00; G06F 11/32; G06F 13/00
[52] U.S. Cl. ..................... 709/249; 709/217; 709/218; 709/227; 709/228; 709/229; 709/246; 709/250; 713/201; 713/202
[58] Field of Search .................. 395/200.47, 200.48, 395/200.58, 200.59, 200.57, 200.77, 200.78, 200.79, 186, 187.01, 188.01; 709/217–219, 227–229, 247–249, 200–203, 206, 246–250; 713/200–202

[56] References Cited

U.S. PATENT DOCUMENTS

| | | | |
|---|---|---|---|
| 5,623,601 | 4/1997 | Vu ........................................... | 713/201 |
| 5,634,005 | 5/1997 | Matsuo .................................... | 709/206 |
| 5,727,950 | 3/1998 | Cook et al. .............................. | 434/350 |
| 5,778,174 | 7/1998 | Cain ........................................ | 713/201 |
| 5,793,982 | 8/1998 | Shrader et al. .......................... | 709/232 |
| 5,826,014 | 10/1998 | Coley et al. ............................. | 713/201 |
| 5,835,726 | 11/1998 | Shwed et al. ............................ | 709/229 |
| 5,864,666 | 1/1999 | Shrader .................................... | 709/229 |
| 5,884,033 | 3/1999 | Duvall et al. ............................ | 709/206 |
| 5,889,958 | 3/1999 | Willens ................................... | 709/229 |

OTHER PUBLICATIONS

Luotonen et al, "World Wide Web proxies", Computer Network and ISDN System 27, 1994, pp. 147–154.

*Primary Examiner*—Zarni Maung
*Assistant Examiner*—Bharat Barot
*Attorney, Agent, or Firm*—Jeffrey S. LaBaw

[57] ABSTRACT

Filter rules on a firewall between a secure computer network and a nonsecure computer network are validated from a user interface. A user interface is presented in which a test packet can be defined. The user interface includes controls for defining values for attributes of the test packet, wherein the attributes of the test packet are selected from a set of attributes of normal packets normally sent between the secure and nonsecure computer networks. A defined test packet is validated against a set of filter rules in the firewall or matched against the filter rules to determine those filter rules with matching attributes to the defined packet. When validating, responsive to the failure of the test packet in the validating step, the filter rule in the set of filter rules which denied the test packet is displayed.

27 Claims, 17 Drawing Sheets

FILTER RULE VALIDATION AND ADMINISTRATION FOR FIREWALLS

BACKGROUND OF THE INVENTION

This application is related to copending, commonly assigned application entitled "Web-Based Administration of IP Tunneling on Internet Firewalls" by T. Shrader, Ser. No. 08/773,542, filed Dec. 23, 1996 now U.S. Pat. No. 5,864,666, which is hereby incorporated by reference.

This application relates generally to security systems in a distributed computer network. More particularly, it relates to a web-based interface for administering IP filtering on a firewall computer such as that would be found between the non-secure Internet and a secure company Intranet.

The burdens on Internet administrators have been rapidly growing both in volume and in complexity. Chief among them is the need for corporate administrators to administer Internet firewalls which connect a company's or organization's secure Intranet to the outside unsecure Internet. Generally in the prior art, the interface for firewall is a command line or SMIT interface which allows the administrator to manage Internet firewall characteristics and operations. These types of interfaces require a the memorization of many commands. Further, administrators are required to piece together output from different actions to administrate the filter rules which govern the firewall. This is an obvious inconvenience as administrators must remember or write down information from a plurality of screens. In short, the interface is anything but user friendly.

The present invention described below provides a user friendly interface for the administration of IP filtering on an Internet firewall.

SUMMARY OF THE INVENTION

Therefore, it is an object of the invention to improve the interface for administering filtering on a firewall computer administering filter rules on a firewall between a secure computer network and a nonsecure computer network.

In one preferred embodiment of the invention, a first pane in which a sample packet can be defined is presented. A defined sample packet is validated against a set of filter rules in the firewall. Responsive to the failure of the sample packet in the validating step, the filter rule in the set of filter rules which caught the sample packet is displayed. A list of filter rules from the set of filter rules may be displayed in a second pane, wherein the filter rule which caught the sample packet is presented in a different manner than other filter rules in the presented list. A third pane in which a graphical bar representing the set of filter rules may be presented. The distance that the packet travelled in the set of filter rules is indicated by changing the presentation of the graphical bar at a position representative of the filter rule which caught the sample packet.

In another embodiment of the invention, a pane in which a sample packet can be entered is presented. A query is run on a sample packet to determine whether any filter rules share attributes with the sample packet. The results of the query are displayed in a scatter bar representing a set of filter rules, wherein locations of matching filter rules are indicated by lines through the scatter bar. A list of filter rules is presented the matching filter rules are displayed in a different manner than nonmatching filter rules. A small bar is displayed proximate to the scatter bar, the small bar indicating a portion of the set of filter rules displayed as the list of filter rules relative to a complete list of tunnel definitions represented by the scatter bar. At this point, an action may be performed on a selected filter rule.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
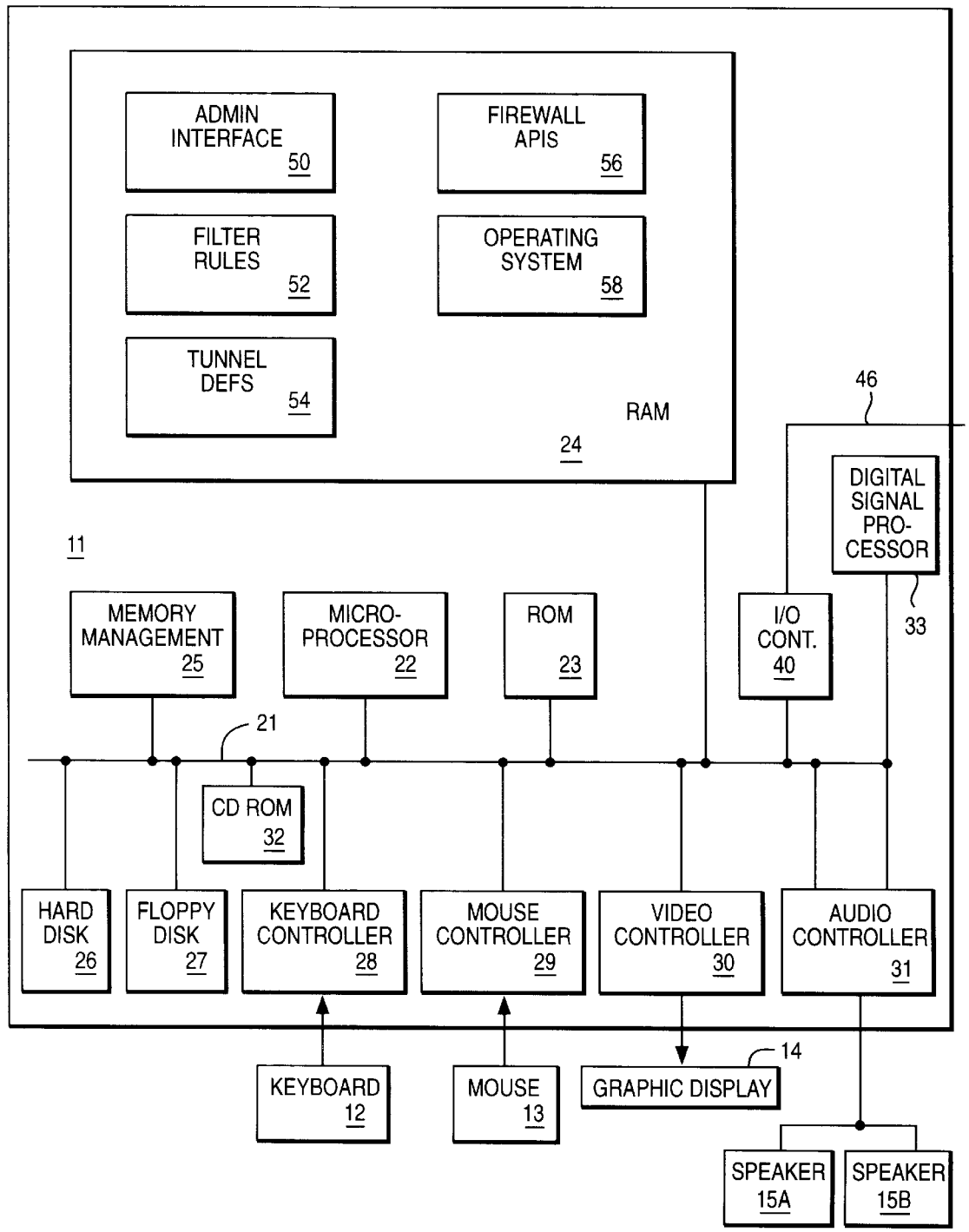
FIG. 1 depicts a computer system configured according to the teachings of the present invention.

In FIG. 1, a computer, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as a computer program product, i.e. sets of instructions 50–58 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. The program may also be stored in the memory of another computer system to be sent over the network or an external network such as the Internet when desired. One skilled in the art would appreciate that the physical storage of the sets of instructions physically changes the medium upon which it is stored or transmitted electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms of comparing or validating, or other terms that could be associated with a human operator. No action by a human operator is desirable in any of the operations described herein which form part of the present invention; the operations are machine operations processing electrical signals to generate other electrical signals.

An Internet Firewall protects such as IBM's Secure Way Firewall (SWF), allows administrators to create a physical firewall between an internal, secure network and the external, unsecure network of the Internet. Besides the physical connections on the firewall machine, the firewall product provides a number of functions to help administrators control the flow of information out of and into the secure network. These functions include telnet and ftp proxy servers, SOCKS servers, specialized domain name services, IP tunneling across the Internet between secure networks, and the implementation of filter rules to decide which IP packets should be permitted or through the firewall machine.

IP filtering is a feature provided by Internet firewalls. The administrator can define rules based on a number of characteristics to govern the passage of IP packets into the secure network or out of the secure network and into the unsecure Internet. For example, administrators can deny all IP packets with a particular destination address or they can permit all IP packets that arrive from a specified source address and port number.

Another filter rule could protect against IP spoofing, where an attacker changes an IP packet to make it appear that it came from a source IP address that is not the same as the attacker's workstation. The administrator could set up an IP filter rule that rejects IP packets that have a source IP address that is internal to the secure network but is coming from the unsecure network.

Figure 2:
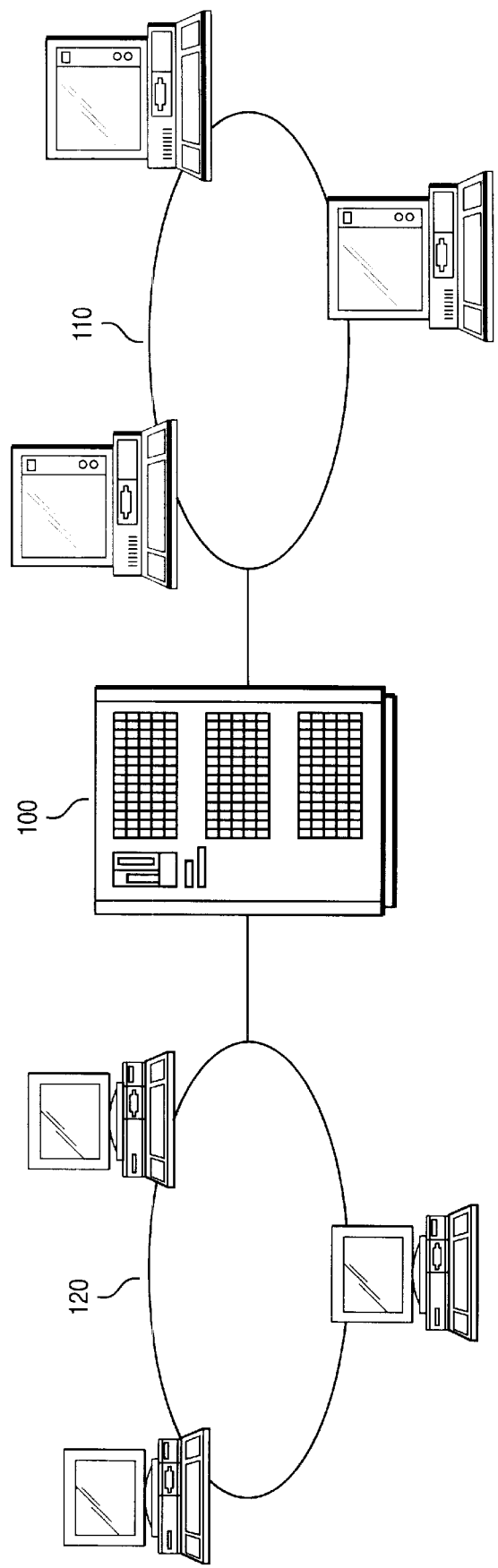
FIG. 2 depicts a firewall configuration including connections to the Internet and the company Intranet.

FIG. 2 depicts a sample firewall configuration that utilizes a dual-homed host configuration. Here, only one machine 100, the bastion, is involved in the firewall and all IP packets are sent from the unsecure network 110 to the secure network 120 or vice versa through this machine. The firewall machine 100 has a screening filter, or IP filter, installed as well as firewall replacements for application gateways that are enabled or disabled on the firewall.

Figure 3:
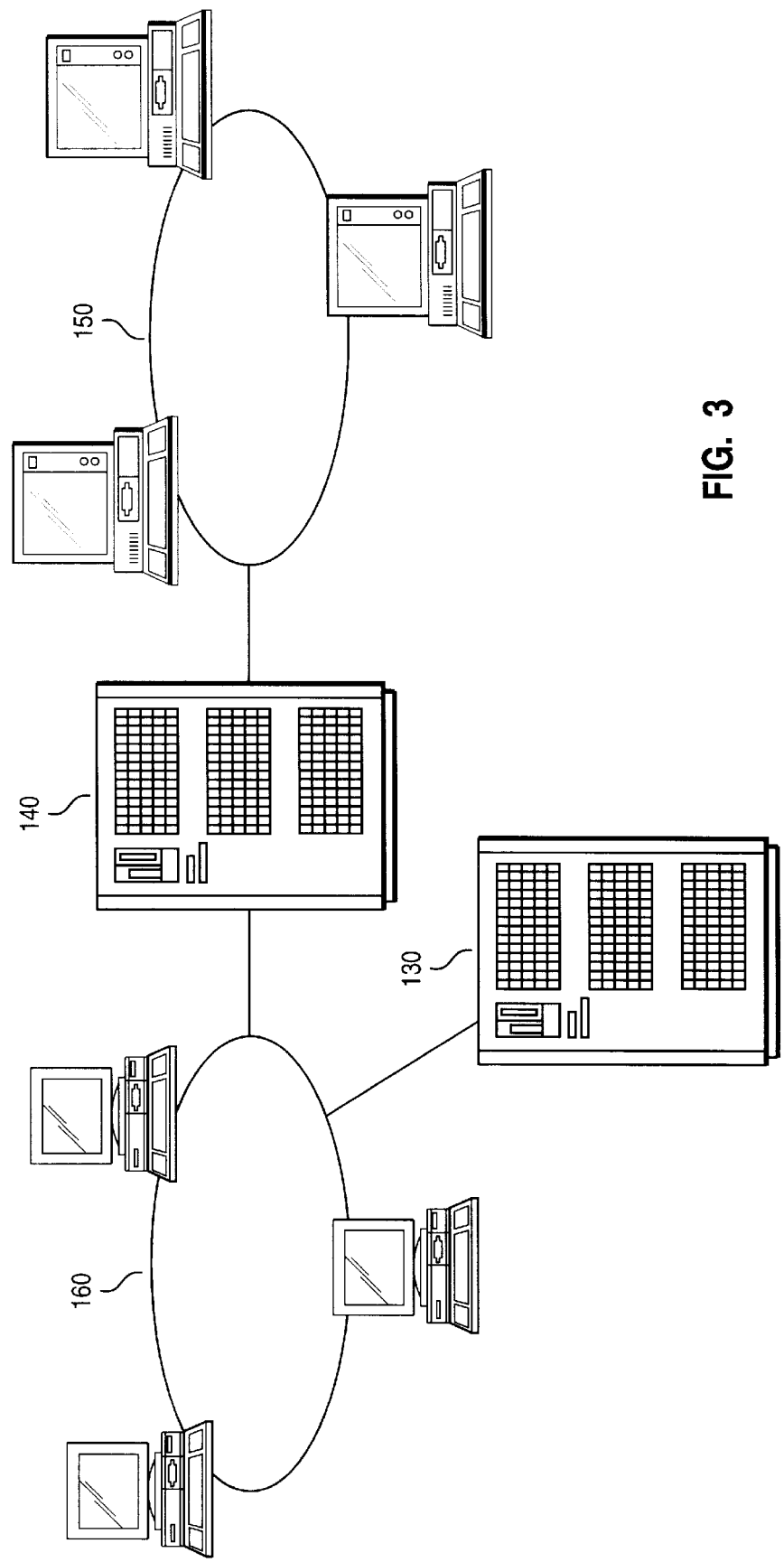
FIG. 3 shows an alternate firewall configuration which might be used with present invention.

FIG. 3 depicts an alternate configuration which place the bastion machine 130 behind another firewall machine 140 that contains the screening filter. This configuration provides more protection to the firewall since IP packets must first be permitted through the firewall before they can be processed by the application gateways on the bastion machine. The unsecure and secure networks are depicted in 150 and 160 respectively.

As discussed above, prior art interfaces are typically command line based in which the administrator is forced to learn a large number of arcane commands. The present invention uses a web based user interface framework which presents a consistent graphical interface to the administrator. The administrator tasks for IP filtering are divided into the definition of filter rules, the validation testing of the set of filter rules, and the querying of filter rules. In the preferred embodiment, these tasks are provided by the following web pages, as described below:

IP Filter Definition Page

IP Filter Validation Test Page

IP Filter Query Page

These pages are described in greater detail below.

The invention is modular in design as the administrator need not install or use all the feature sets of the web-based administration browser. If the administrator is only interested in the management of filter rules, the paths leading to the other administration features, such as those for the SOCKS server and IP tunneling, need not be referenced. The other features can be plugged in when needed. The processes by which the firewall accomplishes IP filtering are not discussed in any detail below as they are known to the art. Further, they will vary according to a particular firewall technology as well as hardware dependencies. The web based interface discussed below will merely call the firewall through APIs or other software interfaces to perform the required functions in response to user input. Where this is not practical, the function of the firewall is replicated at the web pages which comprise the interface.

In contrast to the interfaces in the prior art, which generally must reside at the firewall computer itself, the web based interface of the present invention may reside at any computer in the network provided that proper security can be provided between the administrator's system and the firewall system. While the interface may be at the firewall or another system within the secure network, it is also possible that the administration of the firewall could occur outside the secure network at a particular trusted address. However, this is less preferred for reasons of security. Nonetheless, the interface is portable and allows the administrator a degree of flexibility not allowed by the prior art.

The invention adds many features for IP filtering to the web-based firewall framework which are not available in prior art interfaces, while keeping the layout of its lower level pages consistent. Each page under the module level is divided into panes (or frames), and each pane will display a particular type of information no matter the page. Thus, the administrator can predict the context of the information depending where the information is presented on the page.

Figure 4:
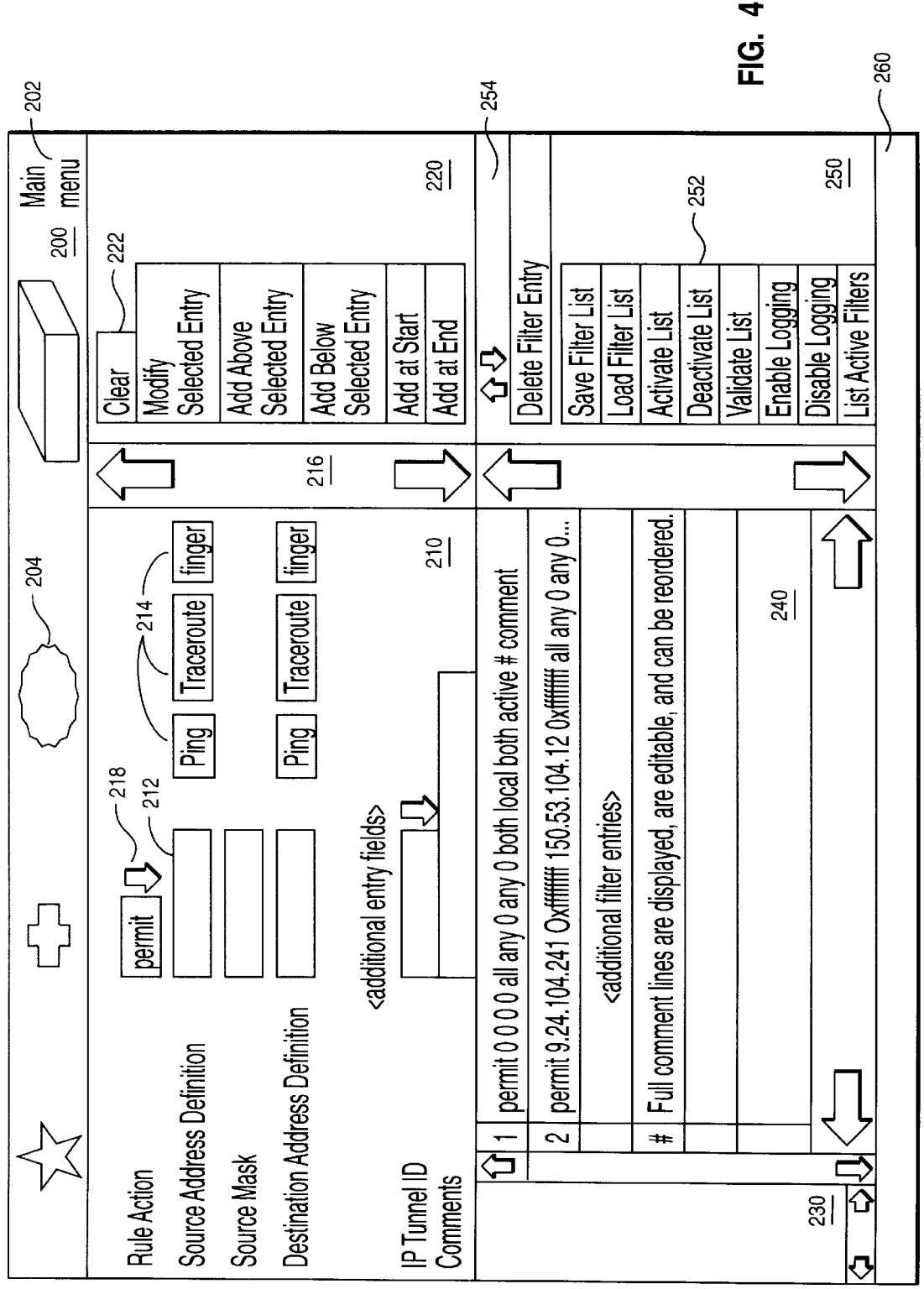
FIG. 4 shows the IP Filter Definition Page in the interface of the present invention.

The layout of a typical page is as follows. Please refer to FIG. 4 wherein the IP Filter Definition Page is shown. A navigation pane 200 runs across the top of the page. From this pane, administrators can select text 202 or icons 204 to navigate to other parts of the administration module or other modules in the firewall interface.

Below the navigation pane 200 lies the display pane 210 and display action pane 220. The display pane 210 provides a place for the page to display entry fields 212 or pushbuttons 214 to activate functions. A scroll bar 216 can be provided to scroll additional entry fields within the display pane 210. On the IP filter definition page, this pane 210 would present entry fields 212 and drop-down lists 218 to allow the administrator to define or modify a selected IP filter rule.

The display action pane 220 presents actions the administrator can initiate by pushbuttons 222, such as modifying or saving the definition of an object in the display pane, or view the results of actions (not shown) initiated by the administrator. These results could be presented graphically, taking the form of icons, such as a happy or sad face 326 if a test IP packet was accepted or denied by a filter rule in the IP Filter Validation Test Page.

The next level of the page is divided into the meter pane 230, list pane 240, and list action pane 250. The main pane in this level is the list pane 240 which allows the administrator to view all the entries pertaining to the given pane. For example, the list pane 240 for the IP filter definition pane will present a scrollable list of all the filters defined for the Internet firewall. Each value representing the filter will be shown as a column for that row.

The list action pane 250 operates in a similar fashion to the display action pane 220. The administrator can choose from a list of actions related to entries in the list pane by activating pushbuttons 252, such as storing a complete list of IP filter rules or exporting the list of IP filter definitions to the target endpoint firewalls.

The meter pane 230 graphically or textually displays information related to statistics initiated by the display pane or the aggregate statistics in the list pane. For example, the meter pane 430 in the IP filter query page will show a bar representing the total of IP filter rows in the list pane with the bar segmented in a different color to show the filter rules that match the query and their visual location in the list.

The ticker tape pane 260 rests at the bottom of the page. This pane provides the administrator with dynamic, statistical information about the entries and objects on the page. The information scrolls from right to left and is updated as the administrator initiates actions on the page. For example, on the IP filter query page, the ticker tape pane 360 would display the number of filter rules that matched the query and statistics about them. These statistics would include the number of filter rules that permitted the packet to flow through the firewall and the number of filter rules that the firewall denied.

In the preferred embodiment, the web-based administration pages can be used in any web browser that supports HTML and Java(TM) applets, such as the Netscape Navigator(TM) browser. As will be seen with reference to the attached figures, all the web pages present a consistent, and thus familiar, layout to the administrator.

The IP Filter Definition Page will now be described in greater detail. This page provides the administrator with the ability to perform the following actions:

View the stored or active filter rules on a firewall.
Create new filter rules,
Modify stored filter rules,
Delete stored filter rules,
Change the order of filter rules,
Load and save filter rules,
Activate or deactivate the filter rule list,
Validate a stored or current filter rule list, and
Enable or disable filter logging.

The administrator can create or modify a filter entry using the entry fields 212 and list boxes 218 in the display pane and the actions in the display action pane. The list pane 240 displays all the filter rules defined for the Internet firewall. The administrator can scroll through them, select a rule for modification or deletion, and select an action on the list action pane 250 to perform an operation on the rules, such as activating the filter list on the firewall where the list is stored.

If the administrator can access target IP addresses on the host from which the web administrator browser is run, the administrator can also ping, traceroute, and finger target IP addresses by activating the correct pushbutton 214. If enabled on the firewall, each action will initiate the corresponding program. Finger for example, might be disabled on the firewall to prevent other users from retrieving user data from outside the firewall. The output for these actions will appear in the meter pane 230 and ticker tape pane 260. This function gives the administrator a convenient way to determine if IP addresses are reachable or identifiable without having to leave the interface.

The ticker tape pane 260 will also display statistical information about the filter rules, such as the number of permit or deny filter rules in the rules list when not being used for the output of the ping, traceroute or filter functions.

Not all the actions shown in this figure are described in this disclosure, but they are representative of the actions that can be performed on this web page.

Figure 5:
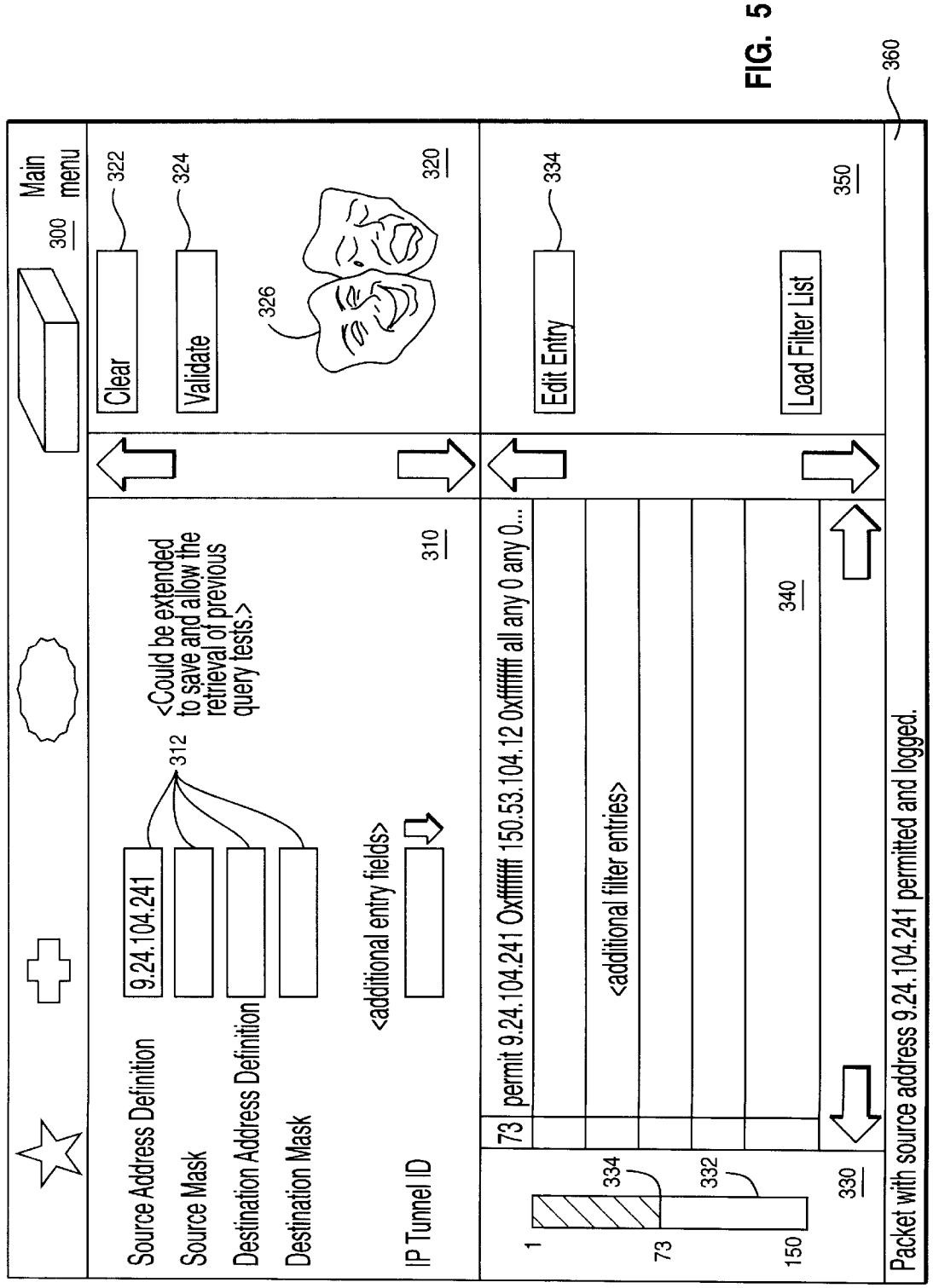
FIG. 5 illustrates the IP Filter Validation Test Page in the interface of the present invention.

The IP Filter Validation Test Page is depicted in FIG. 5. This page provides the administrator with the ability to create a sample packet and validate it against a list of stored filter rules to see which rule the packet matched, whether the action was permitted or denied, and if the action and information about the product was logged to a syslog file. The definition of the packet need not be complete. It could just contain the source address; the first filter rule that matched the source address would be flagged.

The administrator can define the packet in the display pane 310 of the web page. Entry fields 312 for source address definition, source mask, destination address definition and destination mask are provided for that purpose. In the preferred embodiment, this page saves for the retrieval of previous validation test definitions. This saves the administrator from having to reenter the filter definition each time. The ability of the web page to save queries and retrieve predefined queries allows the batch testing of a series of test packets, rather than having an administrator manfully enter each test packet.

While the description above has been related to IP filtering, i.e. the filter rules promulgated by the various Internet bodies, the invention has application to any set of filter rules which may be imposed between secure and nonsecure networks.

The display action pane 320 provides two action selections to the administrator, one button 322 to clear the display pane and the other button 324 to validate the defined packet in the display pane. The display action pane also shows an icon 326, indicating whether the packet was permitted or denied by the filter rules, or if the rule has not been tested yet. This page uses the same process for matching filter rules that the Internet firewall kernel process uses.

The meter pane 330 displays a graphical bar 332 to visually indicates how far 334 the test packet traveled into the list of filter rules. The filter rule that caught the packet is also highlighted in the list of filter rules displayed in the list pane 340. The administrator can also select an operation on the list action pane 350 to load the filter list by activating the load filter list button 352, as well as an edit entry button 354 for a quick path for the administrator to edit an entry highlighted in the list pane 340.

The ticker tape pane 360 displays the result of the filter rule, including information as to whether the packet was permitted or denied and if a log record was written.

Not all the actions shown in this figure are described, but they are representative of the actions that can be performed on this web page.

Figure 6:
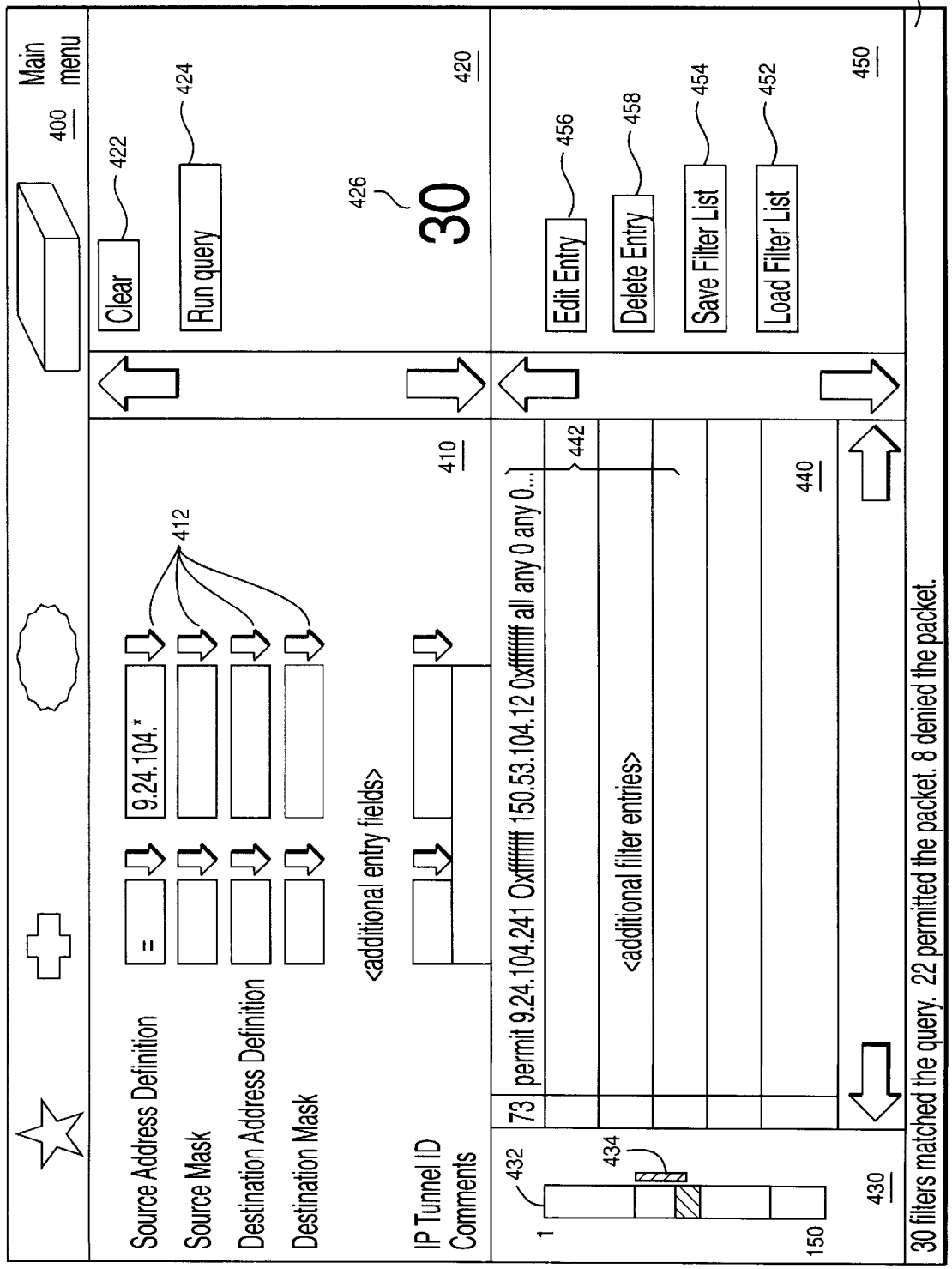
FIG. 6 shows the IP Filter Query Page in the interface of the present invention.

The IP Filter Query Page is shown in FIG. 6. This page provides the administrator with the ability to create a query packet and run it against the set of stored filter rules on the Internet firewall to see all the rules that share the same attributes as the packet. This page differs from the IP Filter Validation Page in that it will show all the filter rules that match, not just the first one, and it does not require the same matching algorithm as implemented by the Internet firewall kernel process. For example, the administrator could specify the source address with a wildcard.

The administrator can define the query in the display pane 410 of the web page. Entry fields 412 are provided for this purpose. Typical query criteria include source address definition, source address, destination address definition and destination mask. As with the IP Filter Validation Page, in the preferred embodiment this page saves and retrieves previous query definitions. This saves the administrator from having to reenter the query definition each time.

The display action pane 420 provides two action selections to the administrator, one button 422 to clear the display pane and the other button 424 to run the query defined in the display pane 410. The display action pane 420 also displays a number 426 in a large font indicating the number of filters that matched the query test.

The meter pane 430 displays a graphical bar which visually indicates the distribution of the matched filter rules. Those filters that matched the query are marked in a different color than the rest of the bar. The bar is called a scatter bar, since it visually and quickly shows the filters that matched the query and their distribution in the filter rules list. A small bar next to the scatter bar is used as a positional cue to show the filters currently displayed in the list pane.

As with the other IP Filter administration web pages, the list pane 440 will display a scrollable list 442 of all the filter rules defined for the firewall. The filter rules that matched the query are displayed in a different color, as opposed to highlighting the entries, to distinguish matching from the act of selection. The administrator can choose (or highlight) an entry to edit or delete it from the filter list. The list action pane 450 allows the administrator to load or save a filter rules list on a firewall by pressing the load filter list push button 452 or the save filter list push button 454 respectively. In addition, it allows the administrator to edit or delete a selected filter rule entry by the selecting the edit pushbutton 456 or delete pushbutton 458.

Not all the actions shown in this figure are described, but they are representative of the actions that can be performed on this web page.

Data Structures
FilterRuleTable Structure
   Number of FilterRule Structures
   Pointer to FilterRule Structure
FilterRule Structure
   Sequence Number
   Rule Action (permit, deny)
   Source Address
   Source Mask
   Destination Address
   Destination Mask
   Protocol
   Interface Adapter
   Routing
   Direction
   Logging Control
   Fragmentation Control
   IP Tunnel ID
   <. . . other variables customizable to each firewall . . . >Comment
IP Filter Definition Page Data Structures
   ListPane modified status bit
   ListPane enable status bit
   ListPane FilterRuleTable
   DisplayPane modified status bit
   DisplayPane FilterRule structure
IP Filter Validation Test Page Data Structures
   DisplayActionPane status icon (permitted, denied, neutral)
   MeterPane upper bound
   MeterPane caught value
   ListPane FilterRuleTable
   DisplayPane FilterRule structure
IP Filter Query Page Data Structures
   DisplayActionPane matched filter number
   MeterPane upper bound
   MeterPane matched FilterRuleTable
   ListPane FilterRuleTable
   DisplayPane FilterRule structure The data structures listed above include the FilterRuleTable structure. This structure holds all the filter rules defined on the firewall. The FilterRule Structure represents all the attributes of a single filter rule. For example, the source and destination addresses in a filter rule are used to check IP packets passing through the firewall. Additional filter rule attributes include the direction of the IP packet flow, whether or not the first IP packet fragment should be checked or if all IP packet fragments in the data stream should be checked, and if the IP packet should be passed through an IP Tunnel.

The IP Filter Definition Page data structures contains the data structures used to display and keep track of information on this Page. The ListPane modified status bit indicates if filter rules have been added to list of filter rules since the rules were last loaded into the interface. The ListPane enable status bit indicates if the rules in the list can be edited or if they are read-only because they were loaded from the set of active, as opposed to stored, filter rules. The ListPane FilterRuleTable is the set of filter rules loaded from the saved or active set of rules on the firewall. The DisplayPane modified status bit indicates if the administrator has changed any information on the DisplayPane. The DisplayPane FilterRule structure holds all the values displayed in the display pane itself.

The IP Filter Validation Page data structures contains the data structures used to display and keep track of information on this Page. The DisplayActionPane status icon indicates if the filter rule defined in the display pane was permitted or denied by the set of filter rules loaded into the interface. If the icon is neutral, the validation test has not been performed yet. The MeterPane upper bound is the number of filter rules loaded in the interface. The MeterPane caught value is the sequence number of the filter rule which matches the IP packet definition in the display pane. The ListPane FilterRuleTable is the set of filter rules loaded from the saved set of rules on the firewall. The DisplayPane FilterRule structure holds all the values displayed in the display pane itself.

The IP Filter Query Page data structures contains the data structures used to display and keep track of information on this page. The DisplayActionPane matched filter number is the number of filter rules loaded in the interface that match the query specification of the IP packet in the display pane. The MeterPane upper bound is the number of filter rules loaded in the interface. The MeterPane matched FilterRuleTable is a set of those filter rules loaded in the interface that match the query specification of the IP packet in the display pane. The ListPane FilterRuleTable is the set of filter rules loaded from the saved set of rules on the firewall. The DisplayPane FilterRule structure holds all the values displayed in the display pane itself.

Figure 7:
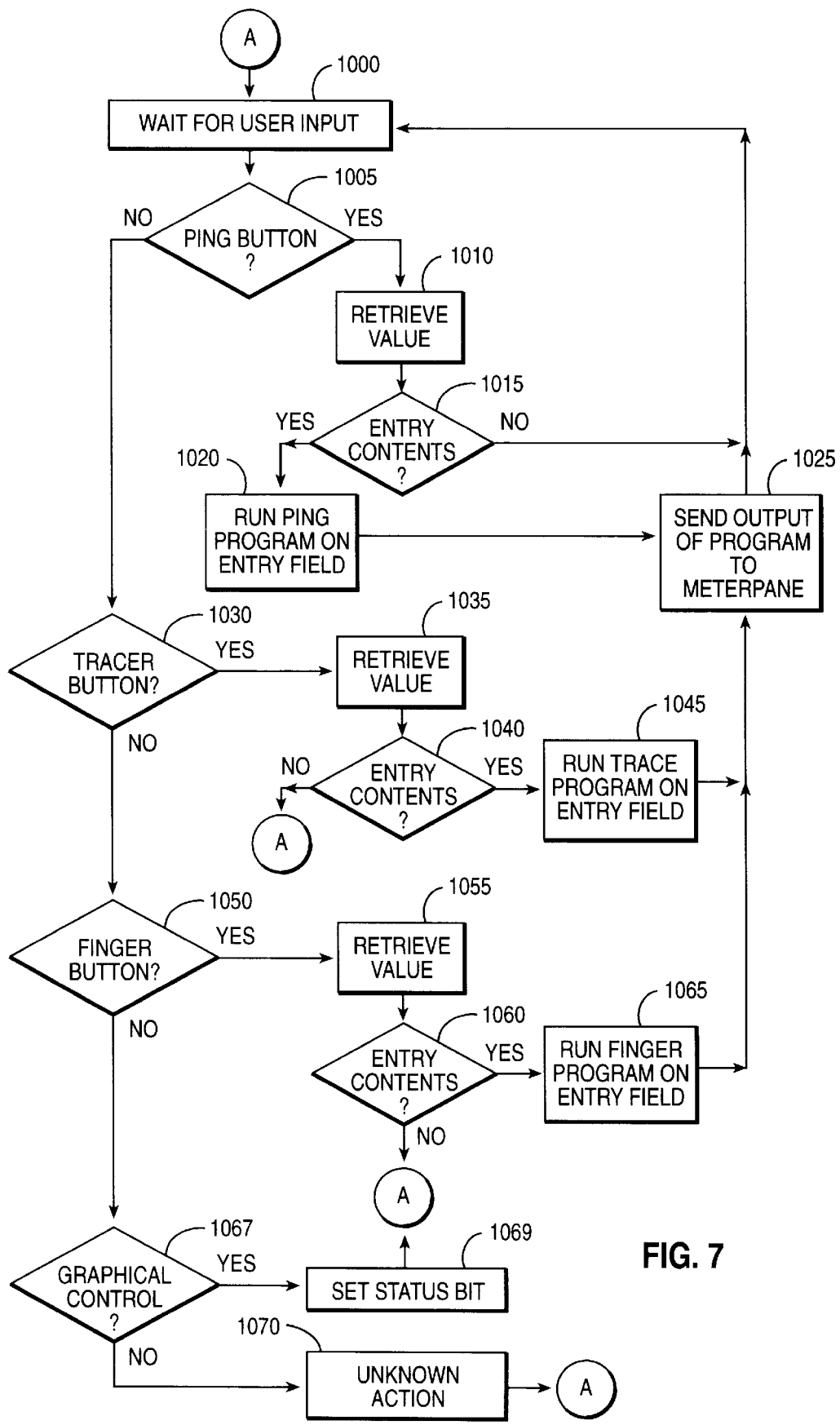
FIG. 7 depicts the flow of actions and display pane in the IP Filter Definition Page.

The flow of system actions taken as a result of user input in the Display Pane of the IP Filter Definition Page are shown in FIG. 7. Flow begins at function block 1000 where the system waits for an action from the administrator. Once the administrator performs an action on the Display Pane, flow proceeds to decision block 1005.

At decision block 1005, the Display Pane checks to see if the Ping button was pressed. If the Ping button was not pressed, control proceeds to decision block 1030. If the Ping button was pressed, control proceeds to function block 1010. At function block 1010, the Display Pane gets the value in the entry field associated with the pressed button. Control proceeds to decision block 1015 where the contents of the entry field is checked. If there is no value in the entry field, control proceeds to control block 1000. If there is a value in the entry field, control proceeds to function block 1020. At function block 1020, the ping program is run on the contents of the entry field. Control proceeds to function block 1025.

At function block 1025, the Display Pane sends the output of the program executed in the previous block, whether successful or not, to the Meter Pane for the set duration that the program should run. Afterwards, control proceeds to function block 1000.

At decision block 1030, the Display Pane checks to see if the Traceroute button was pressed. If the Traceroute button was not pressed, control proceeds to decision block 1050. If the Traceroute button was pressed, control proceeds to function block 1035. At function block 1035, the Display Pane gets the value in the entry field associated with the pressed button. Control proceeds to decision block 1040 where the contents of the entry field is checked. If there is no value in the entry field, control proceeds to control block 1000. If there is a value in the entry field, control proceeds to function block 1045. At function block 1045, the traceroute program is run on the contents of the entry field. Control proceeds to function block 1025.

At decision block 1050, the system checks to see if the Finger button was pressed. If the Finger button was not pressed, control proceeds to decision block 1067. If the Finger button was pressed, control proceeds to function block 1055. At function block 1055, the Display Pane gets the value in the entry field associated with the pressed button. Control proceeds to decision block 1060 where the contents of the entry field is checked. If there is no value in the entry field, control proceeds to control block 1000. If there is a value in the entry field, control proceeds to function block 1065. At function block 1065, the finger program is run on the contents of the entry field. Control proceeds to control block 1025.

At decision block 1067, the system checks to see if the contents of a graphical control was modified. If the contents of a graphical control was not modified, control proceeds to decision block 1070. If the contents of a graphical control was modified, control proceeds to function block 1069. At function block 1069, the Display Action Pane sets the Display Pane modified status bit and control flows to function block 1000. At function block 1070, the Display Pane has detected an unknown action and does nothing. Control returns to function block 1000.

Figure 8A:
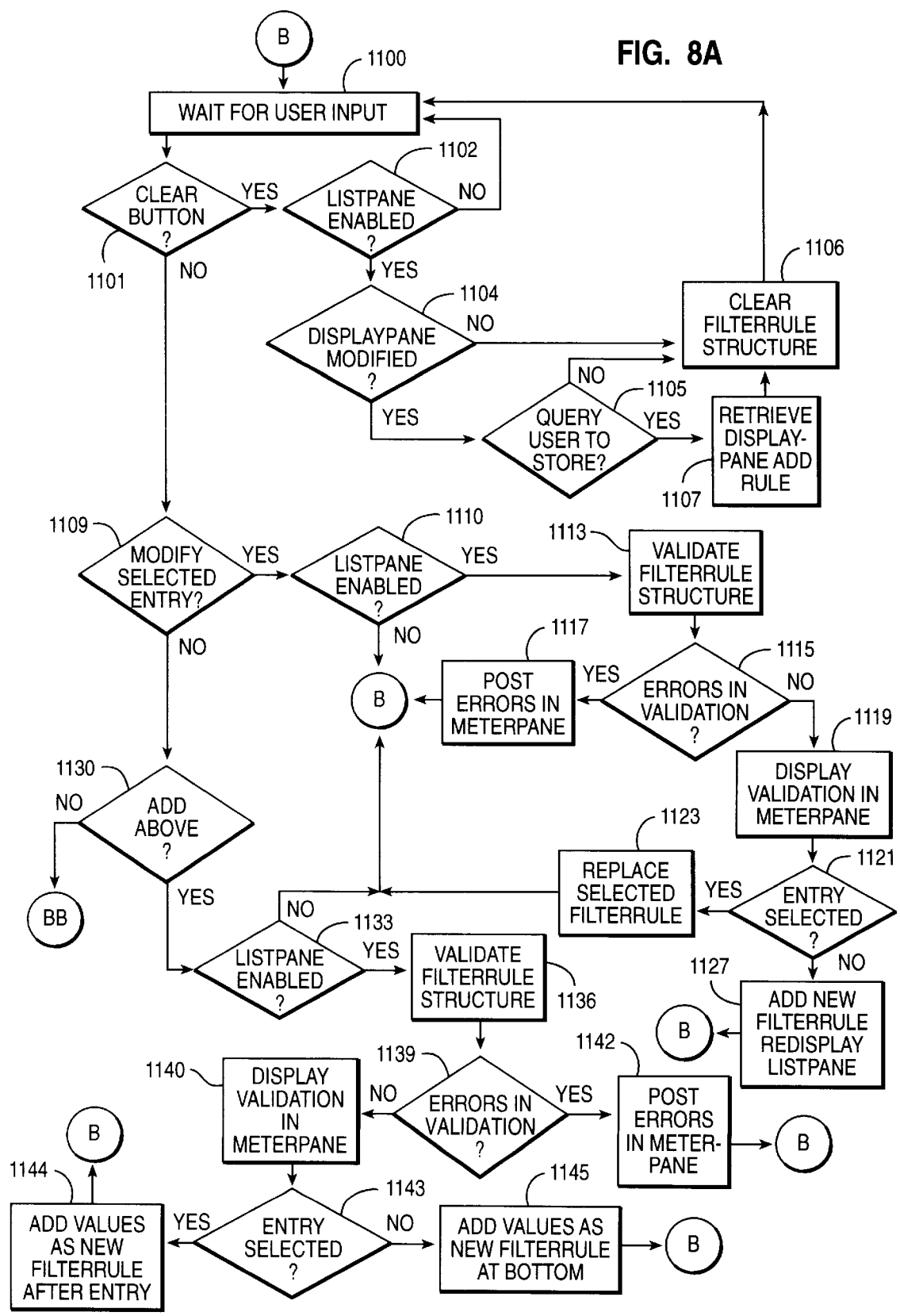
FIGS. 8A and 8B is a flow diagram for the process of actions in the display action pane in the IP Filter Definition Page.
Figure 8B:
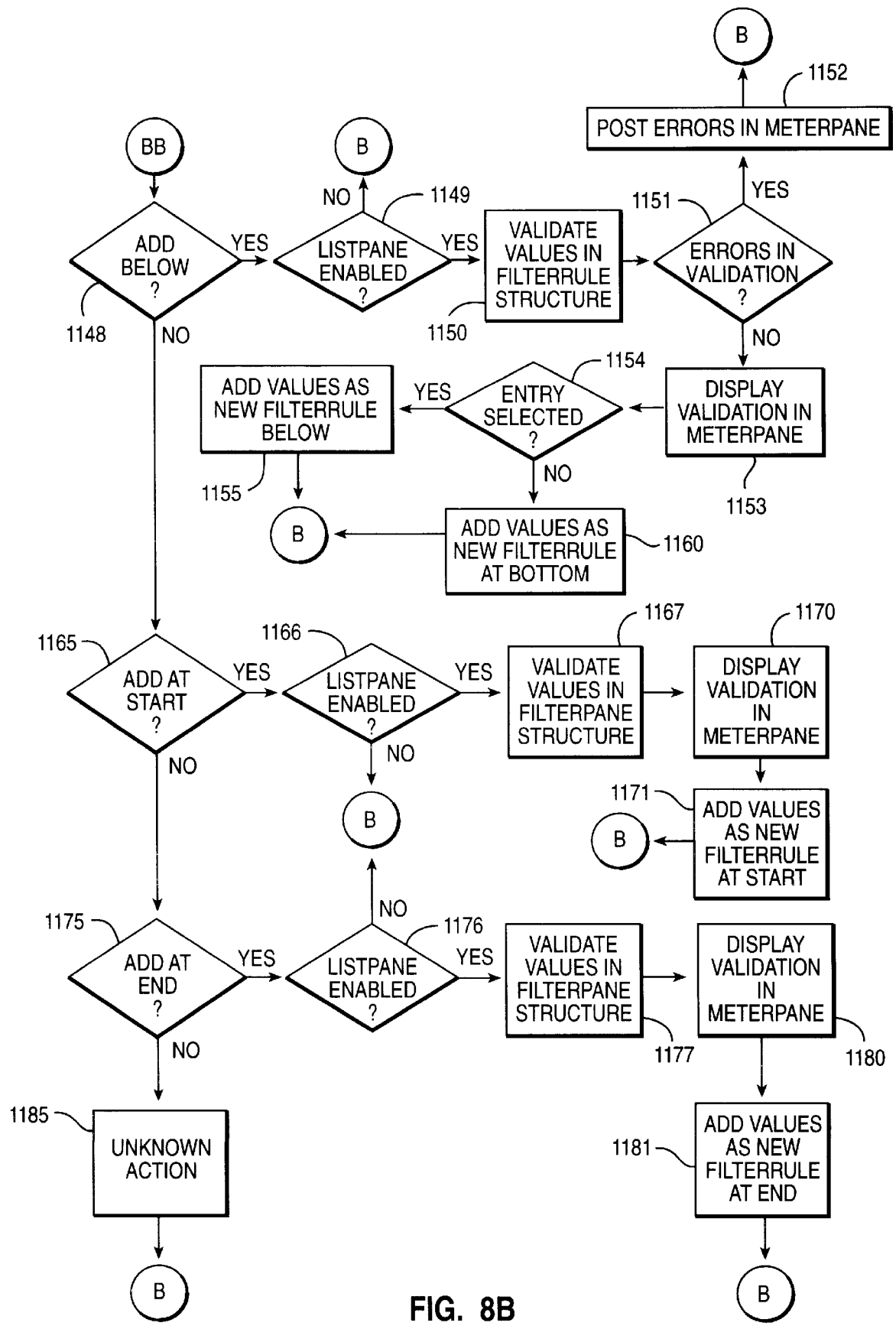

The flow of system actions in response to user input to the Display Action Pane of the IP Filter Definition Page are shown in FIGS. 8A and 8B. Flow begins at function block 1100 where the system waits for an action from the administrator. Once the administrator performs an action on the Display Action Pane, flow proceeds to decision block 1101. At decision block 1101, the system checks to see if the Clear button was pressed. If the Clear button was not pressed, control proceeds to decision block 1109. If the Clear button was pressed, control proceeds to decision block 1102. At decision block 1102, the system checks to see if the List Pane enable status bit is set. If List Pane enable status bit is not set, control proceeds to function block 1100. If List Pane enable status bit is set, control proceeds to decision block 1104.

At decision block 1104, the system checks to see if the Display Pane modified status bit is set. If the status bit was not set, control proceeds to function block 1106. If the status bit was set, control proceeds to decision block 1105. At decision block 1105, the Display Action Pane asks the administrator if the contents of the Display Pane should be stored. If the administrator does not want the contents of the Display Pane stored, control proceeds to function block 1106. If the administrator wants the contents of the Display Pane stored, control proceeds to function block 1107.

At function block 1107, the system retrieves the contents of the Display Pane in the Display Pane FilterRule structure and adds the filter rule to the ListPane FilterRuleTable. The Display Action Pane also sets the List Pane modified status bit. Control proceeds to function block 1106. At function block 1106, the system clears the Display Pane FilterRule structure and displays the cleared Display Pane FilterRule structure in the Display Pane. Control proceeds to function block 1100.

At decision block 1109, the system checks to see if the Modify Selected Entry button was pressed. If the Modify Selected Entry button was not pressed, control proceeds to decision block 1130. If the Modify Selected Entry button was pressed, control proceeds to decision block 1110. At decision block 1110, the system checks to see if the List Pane enable status bit is set. If List Pane enable status bit is not set, control proceeds to function block 1100. If List Pane enable status bit is set, control proceeds to function block 1113.

At function block 1113, the system validates the values in the Display Pane FilterRule structure that were taken from the contents of the Display Pane. Validation warning messages are posted in the Meter Pane. Control proceeds to decision block 1115 where the system checks to see if there were errors in the validation. If there were errors in the validation, the error messages are posted in the Meter Pane in function block 1117 and control proceeds to function block 1100. If there were no errors in the validation, control proceeds from decision block 1115 to function block 1119 where the success of the validation is displayed in the Meter Pane. Control proceeds to decision block 1121.

At decision block 1121, the system checks to see if there is an entry selected in the List Pane. If there is an entry selected in the List Pane, control proceeds to function block 1123. If there is not an entry selected in the List Pane, control proceeds to function block 1127. At function block 1123, the system replaces the selected filter rule entry in the List Pane with the values from the Display Pane FilterRule structure. Control proceeds to function block 1100. At function block 1127, the Display Action Pane adds the values from the Display Pane FilterRule structure as a new filter rule at the bottom of the List Pane FilterRuleTable. The List Pane is redisplayed to show the updated List Pane FilterRuleTable. Control proceeds to function block 1100.

At decision block 1130, the system checks to see if the Add Above Selected Entry button was pressed. If the Add Above Selected Entry button was not pressed, control proceeds to decision block 1148 (FIG. 8B). If the Add Above Selected Entry button was pressed, control proceeds to decision block 1133. At decision block 1133, the system determines whether the List Pane enable status bit is set. If List Pane enable status bit is not set, control proceeds to function block 1100. If List Pane enable status bit is set, control proceeds to function block 1136. At function block 1136, the system validates the values in the Display Pane FilterRule structure that were taken from the contents of the Display Pane. Validation warning messages are posted in the Meter Pane. Control proceeds to decision block 1139 where the system checks to see if there were errors in the validation. If there were errors in the validation, the error messages are posted in the Meter Pane in function block 1142 and control proceeds to function block 1100.

If there were no errors in the validation, control proceeds from decision block 1139 to function block 1140 where the success of the validation is displayed in the Meter Pane. Control proceeds to decision block 1143.

At decision block 1143, the system checks to see if there is an entry selected in the List Pane. If there is an entry selected in the List Pane, control proceeds to function block 1144. If there is not an entry selected in the List Pane, control proceeds to function block 1145. At function block 1144, the Display Action Pane adds the values from the Display Pane FilterRule structure as a new filter rule after the selected entry in the List Pane. The List Pane FilterRuleTable is also updated with the new Display Pane FilterRule structure. The List Pane is redisplayed and control proceeds to function block 1100.

At function block 1145, the system adds the values from the Display Pane FilterRule structure as a new filter rule at the bottom of the List Pane FilterRuleTable. The List Pane is redisplayed to show the updated List Pane FilterRuleTable. Control proceeds to function block 1100.

Referring to FIG. 8B, decision block 1148, the system checks to see if the Add Below Selected Entry button was pressed. If the Add Below Selected Entry button was not pressed, control proceeds to decision block 1165. If the Add Above Selected Entry button was pressed, control proceeds to decision block 1149. At decision block 1149, the system test whether the List Pane enable status bit is set. If List Pane enable status bit is not set, control proceeds to function block 1100. If List Pane enable status bit is set, control proceeds to function block 1150. At function block 1150, the system validates the values in the Display Pane FilterRule structure that were taken from the contents of the Display Pane. Validation warning messages are posted in the Meter Pane. Control proceeds to decision block 1151 where the system checks to see if there were errors in the validation. If there were errors in the validation, the error messages are posted in the Meter Pane in function block 1152 and control proceeds to function block 1100.

If there were no errors in the validation, control proceeds from decision block 1151 to function block 1153 where the success of the validation is displayed in the Meter Pane. Control proceeds to decision block 1154. At decision block 1154, the system checks to see if there is an entry selected in the List Pane. If there is an entry selected in the List Pane, control proceeds to function block 1155. If there is not an entry selected in the List Pane, control proceeds to function block 1160. At function block 1155, the system adds the values from the Display Pane FilterRule structure as a new filter rule below the selected entry in the List Pane. The List Pane FilterRuleTable is also updated with the new Display Pane FilterRule structure. The List Pane is redisplayed and control proceeds to function block 1100. At function block 1160, the system adds the values from the Display Pane FilterRule structure as a new filter rule at the bottom of the List Pane FilterRuleTable. The List Pane is redisplayed to show the updated List Pane FilterRuleTable. Control proceeds to function block 1100.

At decision block 1165, the system checks to see if the Add at Start button was pressed. If the Add at Start button was not pressed, control proceeds to decision block 1175. If the Add at Start button was pressed, control proceeds to decision block 1166. At decision block 1166, the system sees whether the List Pane enable status bit is set. If List Pane enable status bit is not set, control proceeds to function block 1100. If List Pane enable status bit is set, control proceeds to function block 1167. At function block 1167, the system validates the values in the Display Pane FilterRule structure that were taken from the contents of the Display Pane. Validation warning messages are posted in the Meter Pane. As above, the system checks to see if there were errors in the validation (not shown). If there were errors in the validation, the error messages are posted in the Meter Pane and control proceeds to function block 1100.

If there were no errors in the validation, control proceeds to function block 1170 where the success of the validation is displayed in the MeterPane. Control proceeds to function block 1171. At function block 1171, the system adds the values from the Display Pane FilterRule structure as a new filter rule at the start of the List Pane FilterRuleTable. The List Pane is redisplayed to show the updated List Pane FilterRuleTable. Control proceeds to function block 1100.

At decision block 1175, the system checks to see if the Add at End button was pressed. If the Add at End button was not pressed, control proceeds to function block 1185. If the Add at End button was pressed, control proceeds to decision block 1176. At decision block 1176, the system checks to see if the List Pane enable status bit is set. If List Pane enable status bit is not set, control proceeds to function block 1100. If List Pane enable status bit is set, control proceeds to function block 1177. At function block 1177, the system validates the values in the Display Pane FilterRule structure that were taken from the contents of the Display Pane. Validation warning messages are posted in the Meter Pane. As above, the system checks to see if there were errors in the validation (not shown). If there were errors in the validation, the error messages are posted in the Meter Pane (not shown) and control proceeds to function block 1100.

If there were no errors in the validation, control proceeds to function block 1180 where the success of the validation is displayed in the Meter Pane. Control proceeds to function block 1181. At function block 1181, the system adds the values from the Display Pane FilterRule structure as a new filter rule at the end of the ListPane FilterRuleTable. The List Pane is redisplayed to show the updated List Pane FilterRuleTable. Control proceeds to function block 1100. At function block 1185, the Display Pane has detected an unknown action and does nothing. Control returns to function block 1100.

Figure 9:
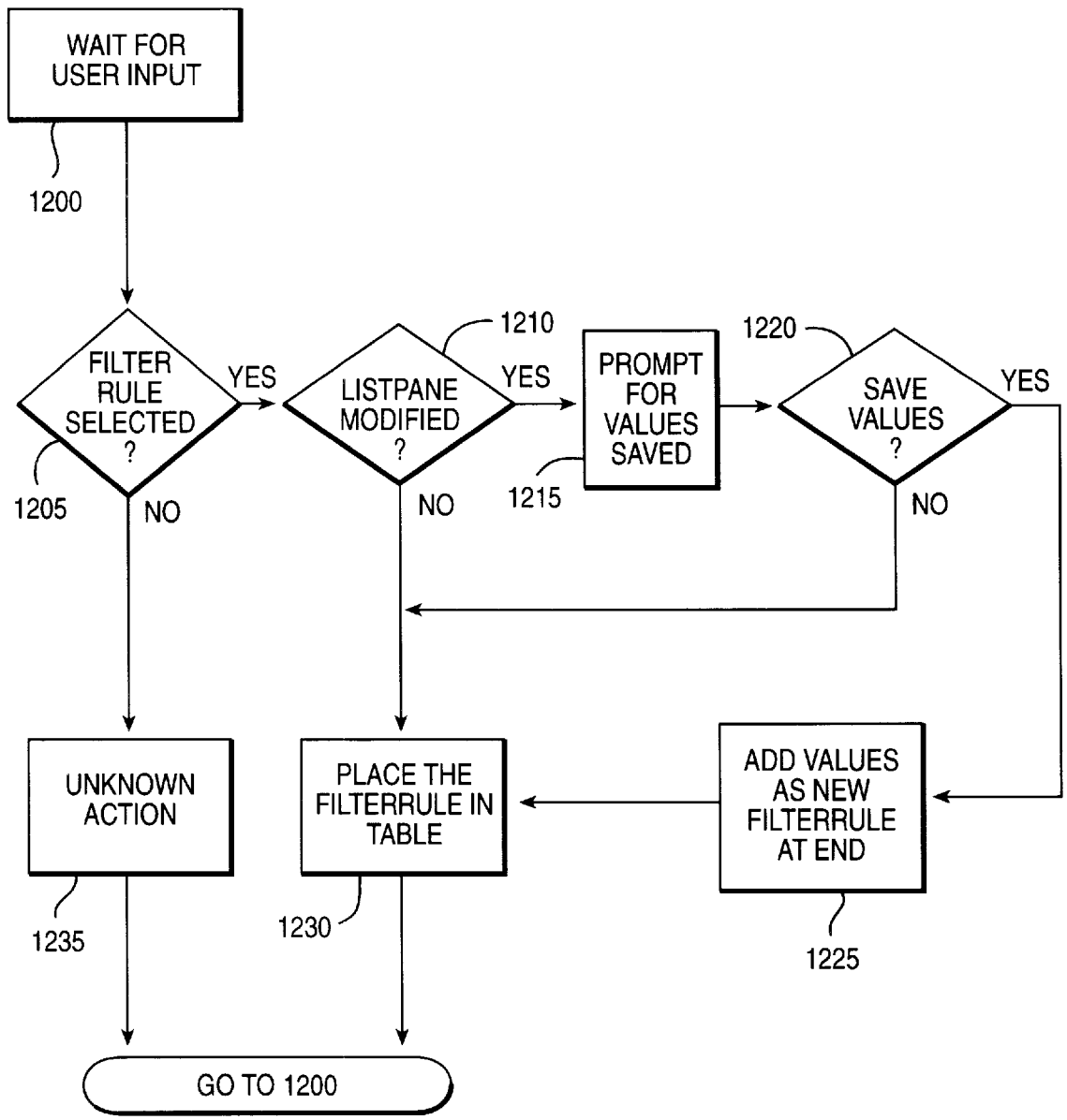
FIG. 9 Depicts the flow of action in the list pane in the IP Filter Definition Page.

The flow of actions in the List Pane of the IP Filter Definition Page are shown in FIG. 9. Flow begins at function block 1200 where the system waits for an action from the administrator. Once the administrator performs an action on the List Pane, flow proceeds to decision block 1205. At decision block 1205, the system checks to see if a filter rule entry was selected. If a filter rule entry was not selected, control proceeds to function block 1235. If a filter rule entry was selected, control proceeds to decision block 1210.

At decision block 1210, the system checks to see if the List Pane modified status bit is set. If the List Pane modified status bit is not set, control proceeds to function block 1230. If the List Pane modified status bit is set, control proceeds to function block 1215. At decision block 1215, the List Pane prompts the administrator if the values in the Display Pane should be saved. Control proceeds to decision block 1220 where the system checks to see if the administrator selected that the values should be saved. If the values should be saved, control proceeds to function block 1225. If the values should not be saved, control proceeds to function block 1230.

At function block 1225, the system adds the values from the Display Pane FilterRule structure as a new filter rule at the end of the List Pane FilterRuleTable. The List Pane is redisplayed to show the updated List Pane FilterRuleTable, but the previously selected entry in the List Pane is still selected. Control proceeds to function block 1230. At function block 1230, the system places the contents of the selected filter rule in the List Pane and hence the List Pane FilterRuleTable into the Display Pane FilterRule structure. The Display Pane is redisplayed to show the contents of the new Display Pane FilterRule structure. Control proceeds to function block 1200. At function block 1235, the system has detected an unknown action and does nothing. Control returns to function block 1200.

Figure 10A:
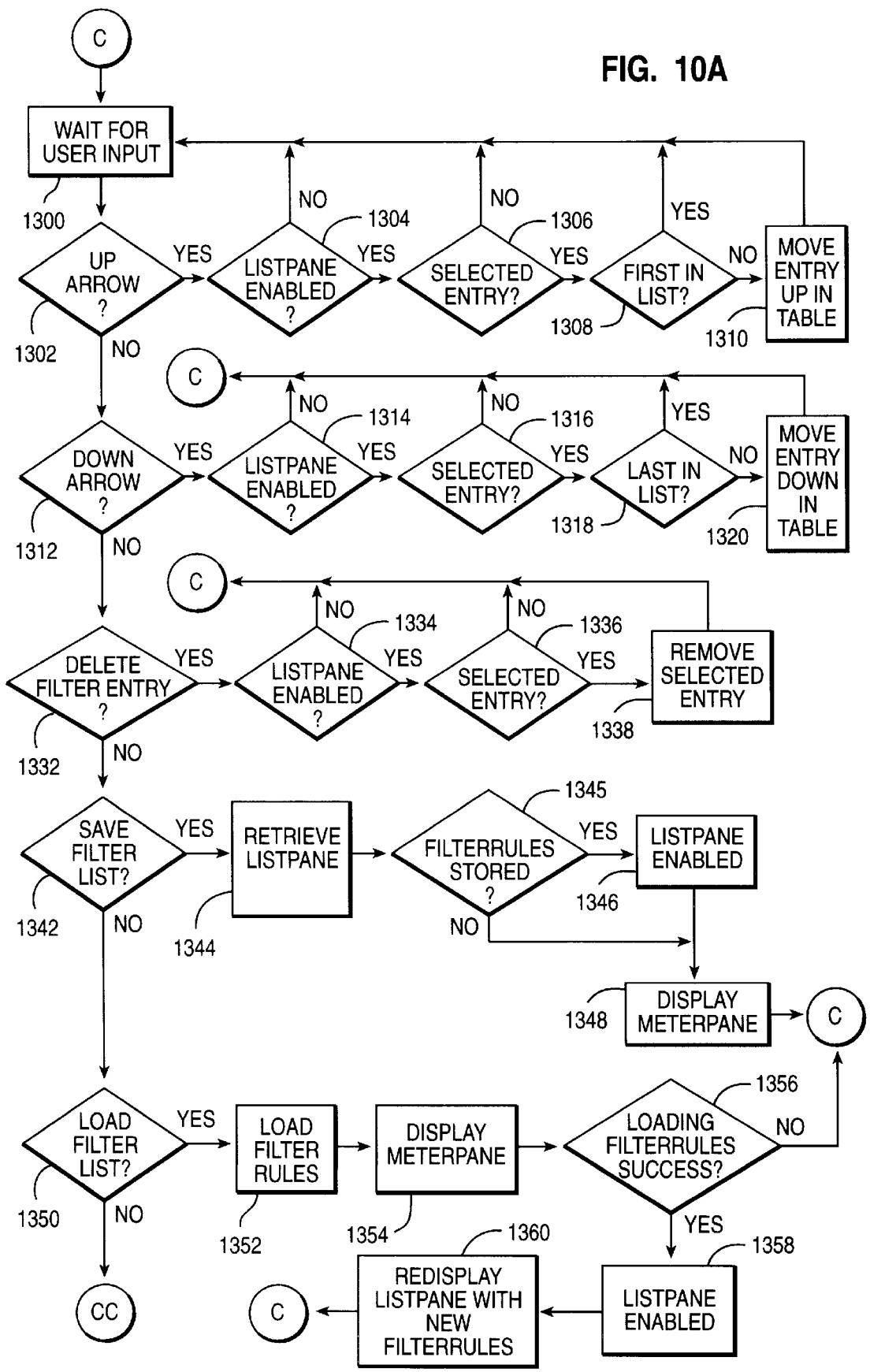
FIGS. 10A and 10B depict the flow of actions in the list action pane in the IP Filter Definition Page.
Figure 10B:
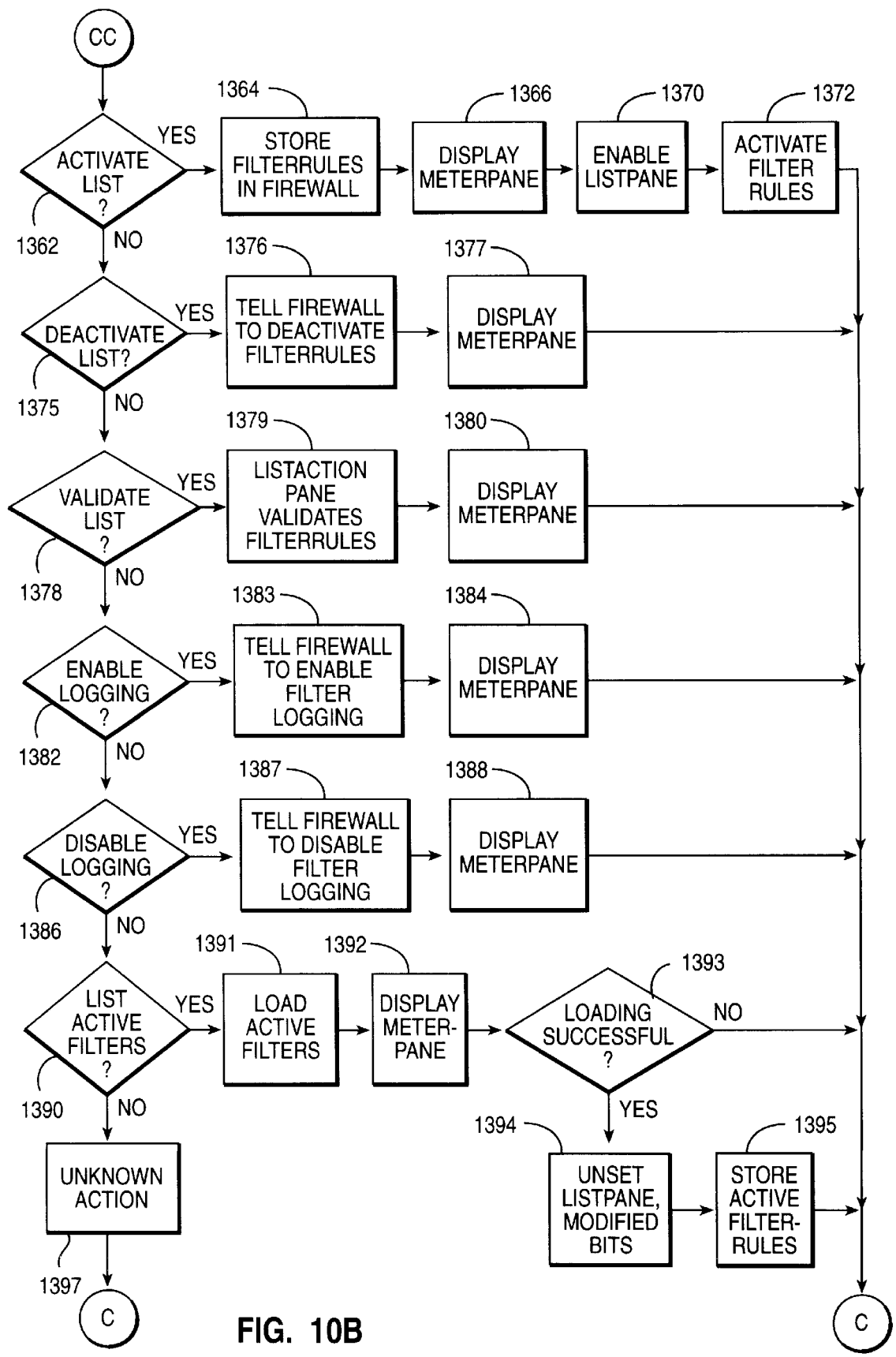

The flow of actions in the List Action Pane of the IP Filter Definition page is shown in FIGS. 10A and 10B. Flow begins at function block 1300 where the system waits for an action from the administrator. Once the administrator performs an action on the List Action Pane, flow proceeds to decision block 1302.

At decision block 1302, the system checks to see if the Up Arrow was pressed. If the Up Arrow was not pressed, control proceeds to decision block 1312. If the Up Arrow was pressed, control proceeds to decision block 1304. At decision block 1304, the system determines whether the List Pane enable status bit is set. If ListPane enable status bit is not set, control proceeds to function block 1300. If List Pane enable status bit is set, control proceeds to decision block 1306.

At decision block 1306, the system finds if there is a selected entry in the List Pane. If there is not a selected entry in the List Pane, control proceeds to function block 1300. If there is a selected entry in the List Pane, control proceeds to decision block 1308. At decision block 1308, the system determines whether the selected entry in the List Pane is the first one in the list. If the selected entry in the List Pane is the first one in the list, control proceeds to function block 1300. If the selected entry in the List Pane is not the first one in the list, control proceeds to function block 1310.

At function block 1310, the system moves the selected entry in the List Pane up one in the List Pane FilterRuleTable. The List Pane is redisplayed to show the contents of the new List Pane FilterRuleTable. The previously selected filter rule in the List Pane is also selected after the redisplay. The List Pane modified status bit is set. Control proceeds to function block 1300.

At decision block 1312, the system checks to see if the Down Arrow was pressed. If the Down Arrow was not pressed, control proceeds to decision block 1332. If the Down Arrow was pressed, control proceeds to decision block 1314. At decision block 1314, the system tests to see if the List Pane enable status bit is set. If List Pane enable status bit is not set, control proceeds to function block 1300. If List Pane enable status bit is set, control proceeds to decision block 1316. At decision block 1316, a test for a selected entry in the List Pane is performed. If there is not a selected entry in the List Pane, control proceeds to function block 1300. If there is a selected entry in the List Pane control proceeds to decision block 1318. At decision block 1318, the system determines if the selected entry in the List Pane is the last one in the list. If the selected entry in the List Pane is the last one in the list, control proceeds to function block 1300. If the selected entry in the List Pane is not the last one in the list, control proceeds to function block 1320.

At function block 1320, the system moves the selected entry in the List Pane down one in the List Pane FilterRuleTable. The List Pane is redisplayed to show the contents of the new List Pane FilterRuleTable. The previously selected filter rule in the List Pane is also selected after the redisplay. The List Pane modified status bit is set. Control proceeds to function block 1300.

At decision block 1332, the system checks to see if the Delete Filter Entry Button was pressed. If the Delete Filter Entry Button was not pressed, control proceeds to decision block 1342. If the Delete Filter Entry Button was pressed, control proceeds to decision block 1334. At decision block 1334, the system tests for the List Pane enable status bit being set. If the List Pane enable status bit is not set, control proceeds to function block 1300. If the List Pane enable status bit is set, control proceeds to decision block 1336.

At decision block 1336, the system determines whether there is a selected entry in the List Pane. If there is not a selected entry in the List Pane, control proceeds to function block 1300. If there is a selected entry in the List Pane control proceeds to function block 1338. At function block 1338, the system removes the selected entry in the List Pane from the List Pane FilterRuleTable. The List Pane is redisplayed to show the contents of the new List Pane FilterRuleTable.

No filter rule in the List Pane is selected after The redisplay. The List Pane modified status bit is set and information on the change to the List Pane FilterRuleTable is displayed in the Meter Pane. Control proceeds to function block 1300.

At decision block 1342, the system tests to see if the Save Filter List Button was pressed. If the Save Filter List Button was not pressed, control proceeds to decision block 1350. If the Save Filter List Button was pressed, control proceeds to function block 1344. At function block 1344, the system retrieves the contents of the List Pane and hence the List Pane FilterRuleTable and stores the set of filter rules in the firewall. Control proceeds to decision block 1345 where the system checks to see if the storing of the filter rules was successful. If the storing of the filter rules was not successful, control proceeds to function block 1348. If the storing of the filter rules was successful, control proceeds to function block 1346.

At function block 1346, the system knows the saving of the filter rules was successful, sets the List Pane enable status bit, and unsets the List Pane modified status bit. Control proceeds to function block 1348. At function block 1348, information on the saving of the List Pane FilterRuleTable is displayed in the Meter Pane. If the stored filter rules list is different from the active filter rules list, the system also indicates this in the Meter Pane. Control proceeds to function block 1300. Active filter rules are those currently enforced by the firewall and are typically stored rules that were loaded by the firewall on startup.

At decision block 1350, the system checks to see if the Load Filter List Button was pressed. If the Load Filter List Button was not pressed, control proceeds to decision block 1362. If the Load Filter List Button was pressed, control proceeds to function block 1352.

At function block 1352, the system loads the set of filter rules from the firewall. If the loaded filter rules list is different from the active filter rules list, the system also indicates this in the Meter Pane. Control proceeds to function block 1354. At function block 1354, information on the loading of the List Pane FilterReuleTable is displayed in the Meter Pane. Control proceeds to decision block 1356. At decision block 1356, the system checks to see if the loading of the filter rules was successful. If the loading of the filter rules was not successful, control proceeds to function block 1300. If the loading of the filter rules was successful, control proceeds to function block 1358.

At function block 1358, the system knows the loading of the filter rules was successful, sets the List Pane enable status bit, and unsets the List Pane modified status bit. Control proceeds to function block 1360. At function block 1360, the system takes the set of filter rules loaded from the firewall and stores them in the List Pane FilterRuleTable and hence the List Pane. The List Pane is redisplayed to show the new contents of the List Pane FilterRuleTable. Control proceeds to function block 1300.

Referring to FIG. 10B, at decision block 1362, the system determines whether the Activate List Button was pressed. If the Activate List Button was not pressed, control proceeds to decision block 1375. If the Activate List Button was pressed, control proceeds to function block 1364. At function block 1364, the system retrieves the contents of the List Pane and hence the List Pane FilterRuleTable and stores the set of filter rules in the firewall. Control proceeds to function block 1366 where the ListActionPane reports of the success or failure of the storing in the Meter Pane. Next, the system checks to see if the storing of the filter rules was successful. If the storing of the filter rules was not successful, control proceeds to function block 1300. If the storing of the filter rules was successful, control proceeds to function block 1370. At function block 1370, the system knows the saving of the filter rules was successful, sets the List Pane enable status bit, and unsets the List Pane modified status bit. Control proceeds to function block 1372.

At function block 1372, the system tells the firewall to activate the stored filter rules. Information on the activation is displayed in the Meter Pane. Control proceeds to function block 1300.

At decision block 1375, the system tests if the Deactivate List Button was pressed. If the Deactivate List Button was not pressed, control proceeds to decision block 1378. If the Deactivate List Button was pressed, control proceeds to function block 1376. At function block 1376, the system tells the firewall to deactivate the stored filter rules. Control proceeds to function block 1377 where information on the deactivation is displayed in the Meter Pane. Control proceeds to function block 1300.

At decision block 1378, the system checks to see if the Validate List Button was pressed. If the Validate List Button was not pressed, control proceeds to decision block 1382. If the Validate List Button was pressed, control proceeds to function block 1379. At function block 1379, the system validates the stored filter rules using the same algorithm as used by the firewall. Control proceeds to function block 1380 where information on the validation is displayed in the Meter Pane. Control proceeds to function block 1300.

At decision block 1382, the system determines whether the Enable Logging List Button was pressed. If the Enable Logging Button was not pressed, control proceeds to decision block 1386. If the Enable Logging Button was pressed, control proceeds to function block 1383. At function block 1383, the system tells the firewall to enable filter logging. Control proceeds to function block 1384 where information on the enablement is displayed in the Meter Pane. Control proceeds to function block 1300.

At decision block 1386, the system checks to see if the Disable Logging List Button was pressed. If the Disable Logging Button was not pressed, control proceeds to function block 1390. If the Disable Logging Button was pressed, control proceeds to decision block 1387. At function block 1387, the system tells the firewall to disable filter logging. Control proceeds to function block 1388 where information on the disablement is displayed in the Meter Pane. Control proceeds to function block 1300.

At decision block 1390, the system checks to see if the List Active Filters Button was pressed. If the List Active Filters Button was not pressed, control proceeds to function block 1397. If the List Active Filters Button was pressed, control proceeds to function block 1391. At function block 1391, the system loads the active filter rules from the firewall. The results of the loading are displayed in the Meter Pane in function block 1392. Control proceeds to decision block 1393 where the system determines whether the loading was successful. if the loading was unsuccessful, control proceeds to function block 1300. If the loading was successful, control proceeds to function block 1394. At function block 1394, the system knows the loading of the active filter rules was successful, unsets the List Pane enable status bit, and unsets the List Pane modified status bit. Control proceeds to function block 1395 where the system stores the set of active filter rules in the List Pane FilterRuleTable and hence the List Pane and displays the List Pane with the new List Pane FilterRuleTable. No filter rule entry is selected in the List Pane. Control proceeds to function block 1300.

At function block 1397, the system has detected an unknown action and does nothing. Control returns to function block 1300.

Figure 11:
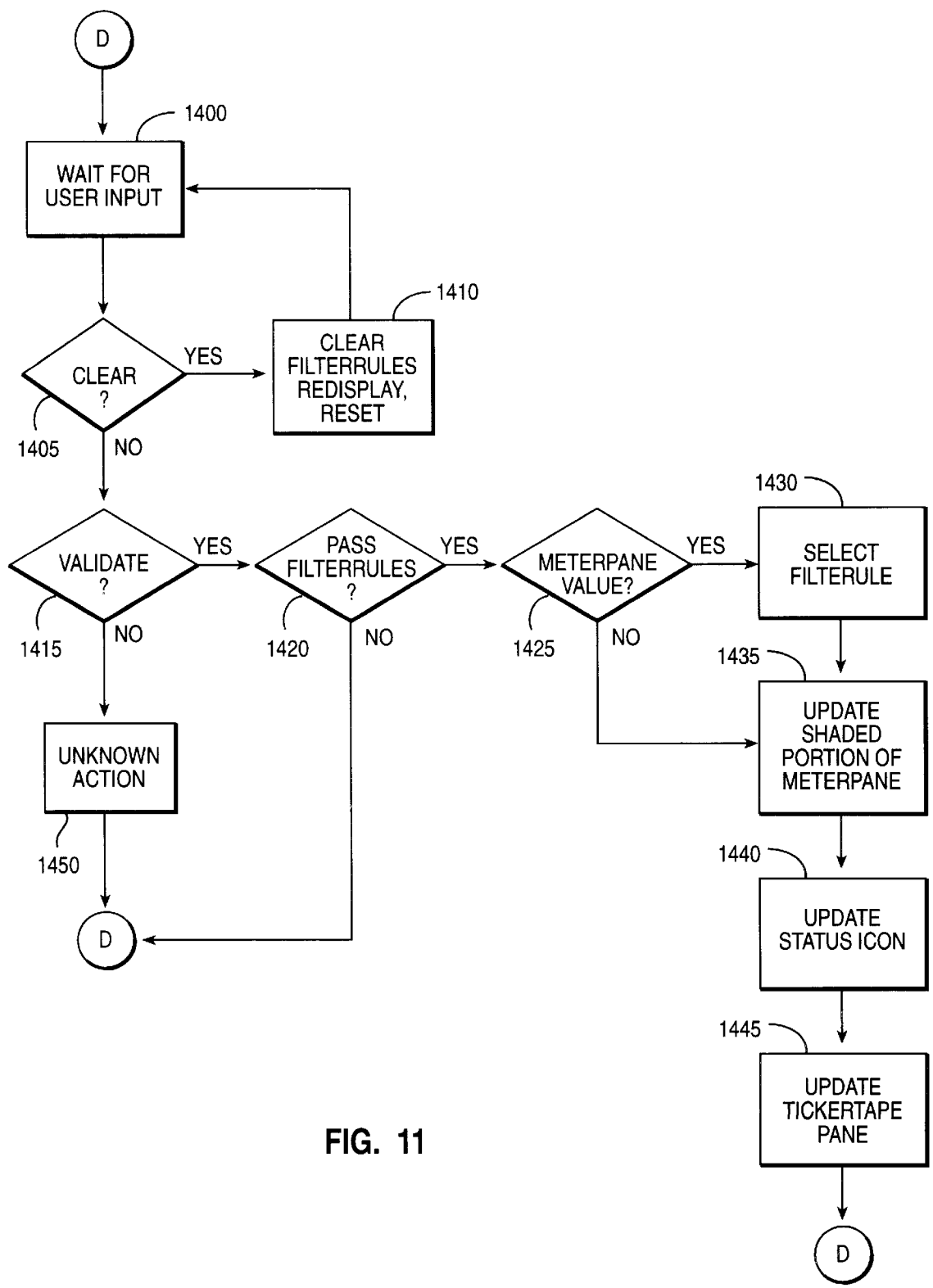
FIG. 11 displays flow diagram for the process in the display action pane in the IP Filter Validation Page.

The flow of system actions in response to user input in the Display Action Pane on the IP Filter Validate Page is shown in FIG. 11. Flow begins at function block 1400 where the system waits for an action from the administrator. Once the administrator performs an action on the Display Action Pane, flow proceeds to decision block 1405. At decision block 1405, the system checks to see if the Clear button was pressed. If the Clear button was not pressed, control proceeds to decision block 1415. If the Clear button was pressed, control proceeds to decision block 1410. At decision block 1410, the system clears the Display Pane FilterRule structure and displays the values of the cleared Display Pane FilterRule structure in the Display Pane. The system also sets the Meter Pane caught value to 0 and redisplays the Meter Pane. The Display Action Pane status icon is set to neutral. Any selected entry in the List Pane is unselected. Control proceeds to function block 1400.

At decision block 1415, the system tests for whether the Validate button was pressed. If the Validate button was not pressed, control proceeds to function block 1450. If the Validate button was pressed, control proceeds to decision block 1420. At decision block 1420, the system retrieves the entries from the Display Pane and hence the Display Pane FilterRule structure. These values are run through the validation test routine to see how far they get through the set of filter rules. The validation test routine is the same one as used by the firewall. The filter rule sequence number that caught the Display Pane FilterRule structure values will be stored in the Meter Pane caught value. If the Display Pane FilterRule structure values passed all the filter rules without getting caught with the permit or deny action, the Meter Pane caught value will be set to zero and the default action is permit as defined by the firewall. Control proceeds to decision block 1425.

At decision block 1425, the system checks the value of the Meter Pane caught value. If the Meter Pane caught value is greater than 0, meaning that a filter rule in the List Pane FilterRuleTable matched the full or incomplete definition of the Display Pane FilterRule structure, control proceeds to function block 1430. If the Meter Pane caught value is equal to zero, meaning that a filter rule in the List Pane FilterRuleTable did not match the full or incomplete definition of the Display Pane FilterRule structure, control proceeds to decision block 1435. At function block 1430, the system selects the filter rule that has the same sequence number as the MeterPane caught value in the ListPane. Control proceeds to function block 1435.

At function block 1435, the system updates the shaded portion of the Meter Pane by shading the portion of the vertical bar that lies between 0 and the Meter Pane caught value. Control proceeds to function block 1440. At function block 1440, the system updates the Display Action Pane status icon according to the action (permit or deny) that matches the FilterRule in the List Pane FilterRuleTable that has the same sequence number as the Meter Pane caught value. The system redisplays the status icon in the DisplayActionPane to show the permit or deny icon. Control proceeds to function block 1445. At function block 1445, the system updates the contents of the Ticker Tape Pane with the values of the FilterRule in the List Pane FilterRuleTable that has the same sequence number as the Meter Pane caught value. Control proceeds to function block 1400.

At function block 1450, the system has detected an unknown action and does nothing. Control returns to function block 1400.

Figure 12:
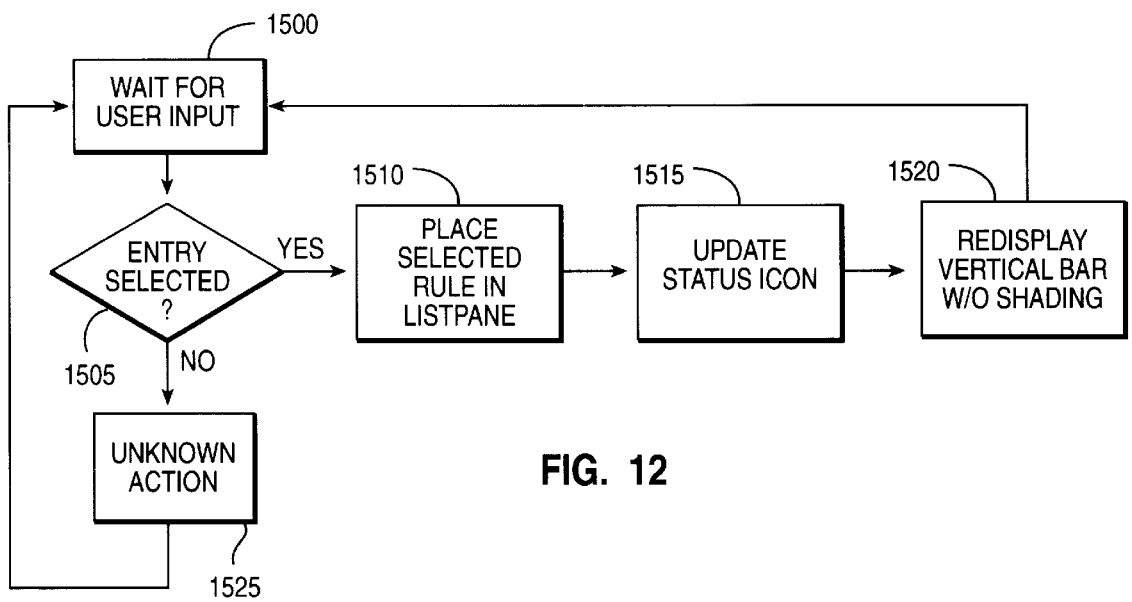
FIG. 12 illustrates the actions associated with the list pane in the IP Filter Validation Page.

The flow of system actions taken in response to user input in the List Pane in the IP Filter Validate Page is shown in FIG. 12. Flow begins at function block 1500 where the system waits for an action from the administrator. Once the administrator performs an action on the ListPane, flow proceeds to decision block 1505. At decision block 1505, the system checks to see if a filter rule entry was selected. If a filter rule entry was not selected, control proceeds to function block 1525. If a filter rule entry was selected, control proceeds to decision block 1510. At function block 1510, the system places the contents of the selected filter rule in the List Pane and hence the List Pane FilterRuleTable into the Display Pane FilterRule structure. The Display Pane is redisplayed to show the contents of the new Display Pane FilterRule structure. Control proceeds to function block 1515.

At function block 1515, the system changes the contents of the Display Action Pane status icon to neutral and redisplays the Display Action Pane to show the new icon. Control proceeds to function block 1520. At function block 1520, the system changes the Meter Pane caught value to 0 and redisplays the Display Action Pane to show the vertical bar without shading. Control proceeds to function block 1500.

At function block 1525, the system has detected an unknown action and does nothing. Control returns to function block 1500.

Figure 13:
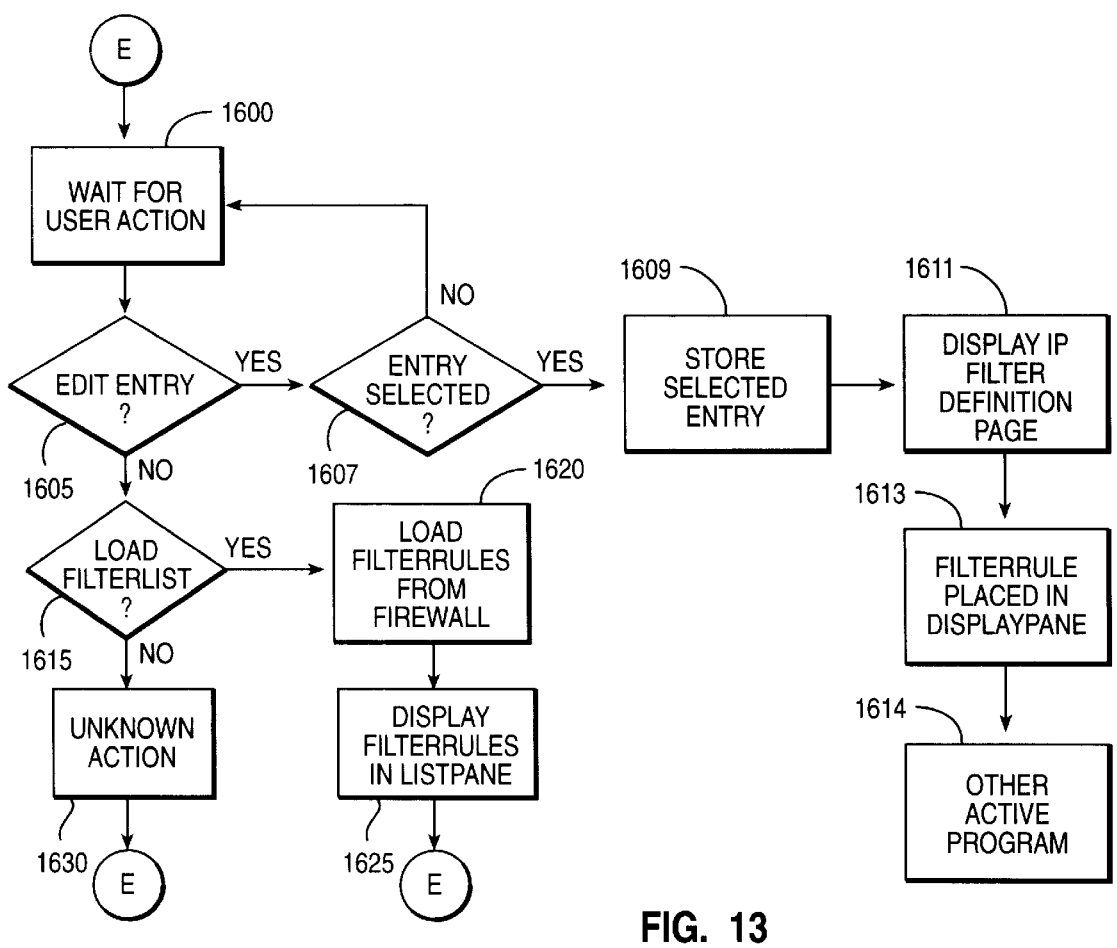
FIG. 13 shows the actions associated with the list action pane in the IP Filter Validation Page.

The flow of system actions in response to user input in the List Action Pane of the IP Filter Validation Test Page are shown in FIG. 13. Flow begins at function block 1600 where the system waits for an action from the administrator. Once the administrator performs an action on the List Action Pane, flow proceeds to decision block 1605.

At decision block 1605, the system determines if the Edit Entry button was pressed. If the Edit Entry button was not pressed, control proceeds to decision block 1615. If the Edit Entry button was pressed, control proceeds to decision block 1607. At decision block 1607, the system checks to see if an entry in the List Pane is selected. If an entry in the List Pane is not selected, control proceeds to function block 1600. If an entry in the List Pane is selected, control proceeds to function block 1609. At function block 1609, the system takes the highlighted or selected entry in the List Pane and stores it in a temporary FilterRule structure. The entire List Pane FilterRuleTable is stored in a temporary FilterRuleTable. Control proceeds to function block 1611 where the system displays the IP Filter Definition Page. Control next proceeds to function block 1613 where the temporary FilterRule structure is placed in the Display Pane of the IP Filter Definition Page and the temporary FilterRuleTable is displayed in the List Pane of the IP Filter Definition Page. Control passes to the set of IP Filter Definition Page actions block 1614.

At decision block 1615, the system checks to see if the Load Filter List button was pressed. If the Load Filter List button was not pressed, control proceeds to function block 1630. If the Load Filter List button was pressed, control proceeds to function block 1620. At function block 1620, the system loads the set of stored IP filter rules from the firewall and places them into the List Pane FilterRuleTable. The Meter Pane upper bound value is set to the number of rules in the List Pane FilterRuleTable. The Meter Pane caught value is set to 0. The Display Action Pane status icon is set to neutral. Control proceeds to function block 1625 where the loaded List Pane FilterRuleTable is shown in the List Pane and the Meter Pane and Display Action Pane are redisplayed to show their new backing values. Control proceeds to function block 1600. At function block 1630, the system has detected an unknown action and does nothing. Control returns to function block 1600.

Figure 14:
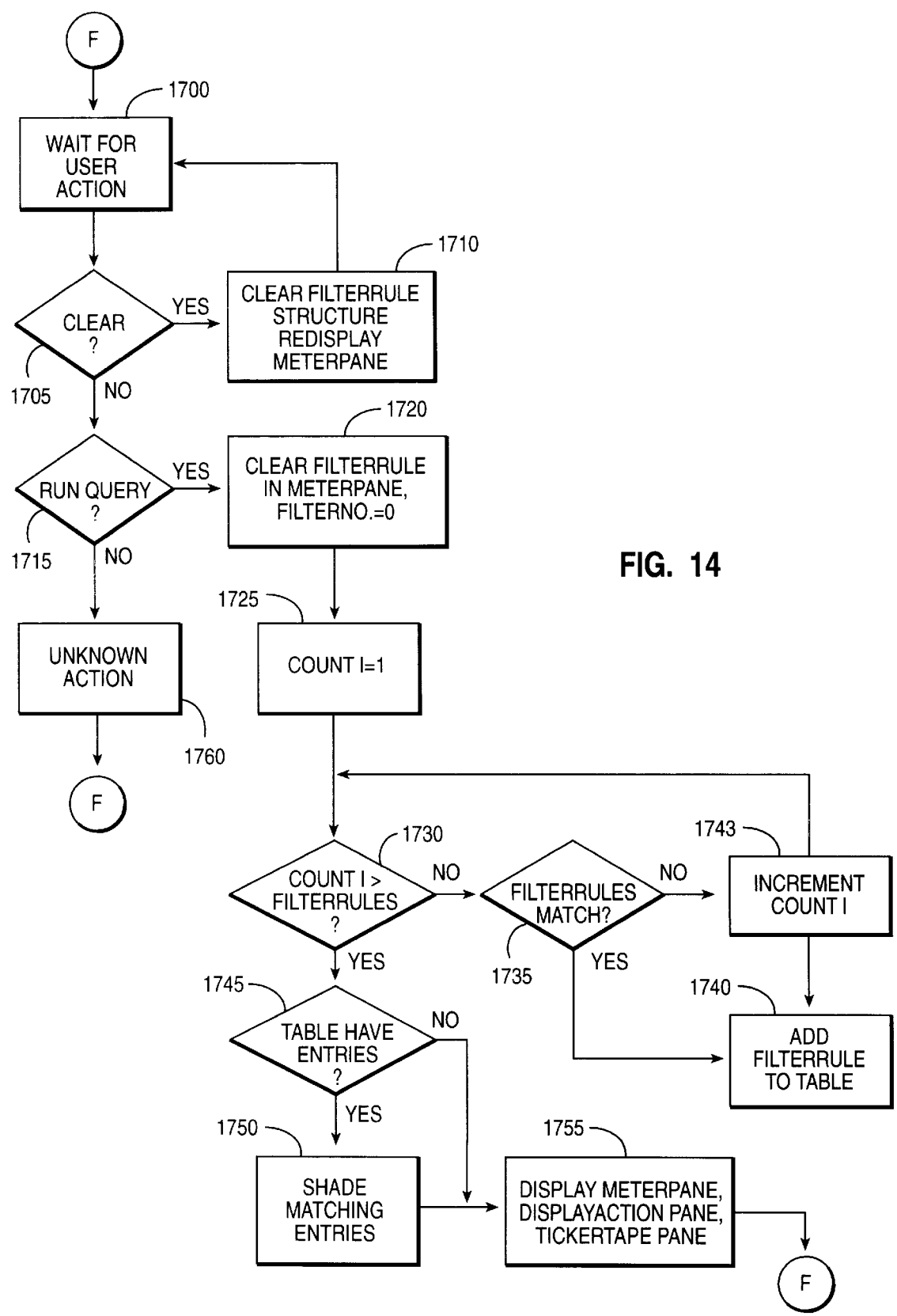
FIG. 14 shows the actions associated with the display action pane in the IP Filter Query Page.

The flow of system actions in response to user input in the Display Action Pane of the IP Filter Query Page are shown in FIG. 14. Flow begins at function block 1700 where the system waits for an action from the administrator. Once the administrator performs an action on the DisplayActionPane, flow proceeds to decision block 1705.

At decision block 1705, the system checks to see if the Clear button was pressed. If the Clear button was not pressed, control proceeds to decision block 1715. If the Clear button was pressed, control proceeds to function block 1710. At function block 1710, the system clears the Display Pane FilterRule structure and displays the values of the cleared Display Pane FilterRule structure in the Display Pane. The Display Action Pane also clears the Meter Pane matched FilterRuleTable and redisplays the Meter Pane. The Display Action Pane matched filter number is set to 0. Any selected entry in the List Pane is unselected. Control proceeds to function block 1700. At decision block 1715, the system determines whether the Run Query button was pressed. If the Run Query button was not pressed, control proceeds to function block 1760. If the Run Query button was pressed, control proceeds to function block 1720. At function block 1720, the Display Action Pane clears the Meter Pane matched FilterRuleTable. The Display Action Pane matched filter number is set to 0. Control proceeds to function block 1725 where counter I is set to 1. Control next proceeds to decision block 1730. At decision block 1730, the Display Action Pane checks to see if counter I is greater than the number of filter rules in the List Pane FilterRuleTable. If counter I is greater than the number of filter rules in the List Pane FilterRuleTable, control proceeds to decision block 1745. If counter I is not greater than the number of filter rules in the List Pane FilterRuleTable, control proceeds to decision block 1735.

At decision block 1735, the system tests to see if the FilterRule structure indexed by counter I in the List Pane FilterRuleTable matches the filter rule query specification as stored in the Display Pane FilterRule structure that was retrieved from the Display Pane. If there is not a match, control proceeds to function block 1743. If there is a match, control proceeds to function block 1740.

At function block 1740, the system adds the FilterRule structure indexed by counter I in the List Pane FilterRuleTable to the Meter Pane matched FilterRuleTable. The Display Action Pane matched filter number is increments by 1. Control proceeds to function block 1743. At function block 1743, the system increments counter I by 1 and proceeds to decision block 1730.

At decision block 1745, the system checks to see if the Meter Pane matched FilterRuleTable has any entries. If there are entries in the Meter Pane matched FilterRuleTable, control proceeds to function block 1750. If the Meter Pane matched FilterRuleTable is empty, control proceeds to function block 1755. At function block 1750, the Display Action Pane shades the matching entries in the Meter Pane matched FilterRuleTable according to the FilterRule structure sequence numbers in the vertical bar of the Meter Pane. The Display Action Pane matched filter number is set to the number of entries in the Meter Pane matched FilterRuleTable. Control continues to function block 1755.

At function block 1755, the system displays the new contents of the Meter Pane matched FilterRuleTable in the Meter Pane. The Display Action Pane is displayed to show the new Display Action Pane matched filter number. The Ticker Tape Pane displays information about the filter rules in the Meter Pane matched FilterRuleTable. Control proceeds to function block 1700. At function block 1760, the system has detected an unknown action and does nothing. Control returns to function block 1700.

Figure 15:
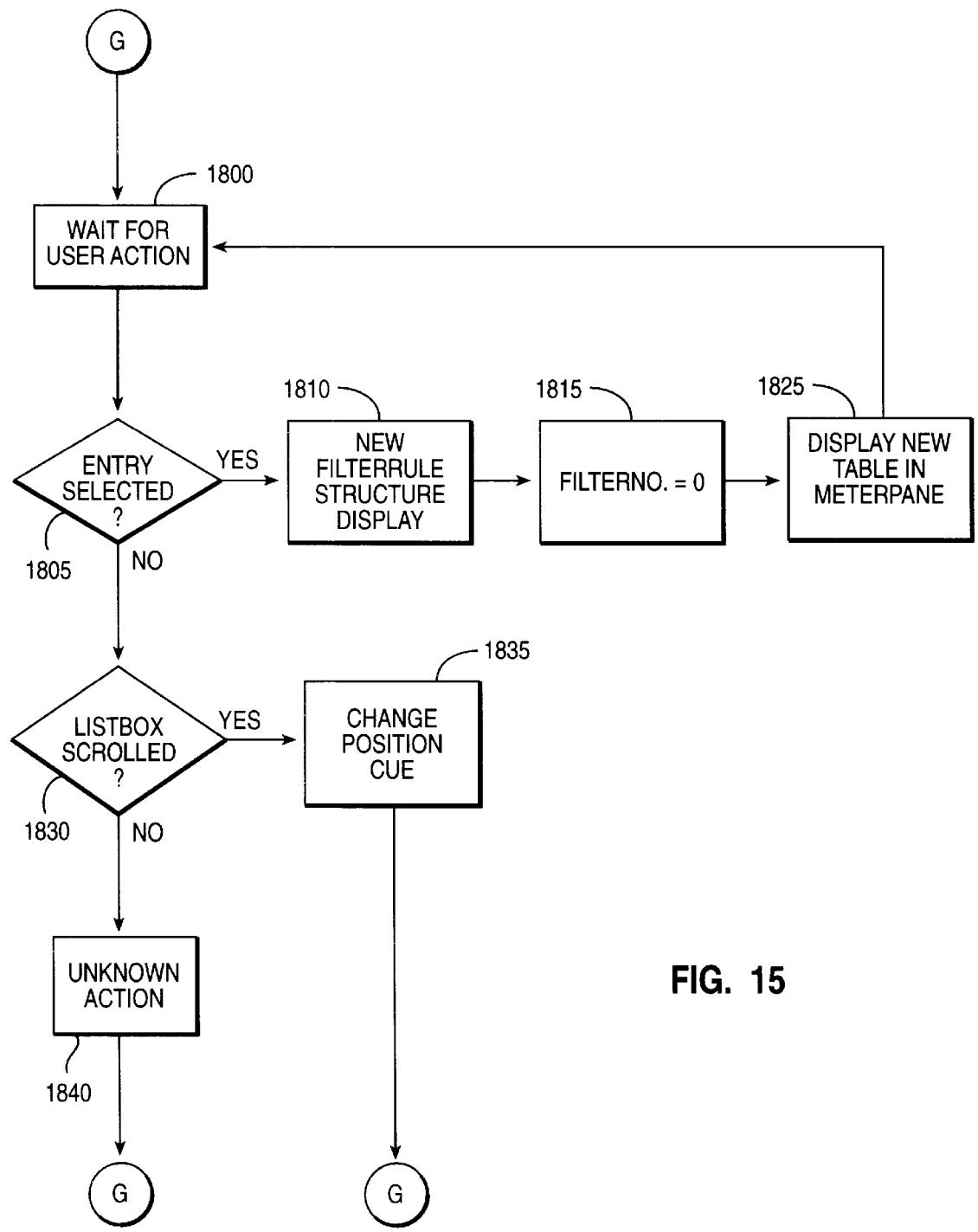
FIG. 15 shows the actions associated in the list pane in the IP Filter Query Page.

The flow of system actions taken in response to user input in the List Pane is shown in FIG. 15. Flow begins at function block 1800 in the IP Filter Query Page where the system waits for an action from the administrator. Once the administrator performs an action on the List Pane, flow proceeds to decision block 1805. At decision block 1805, the system determines whether a filter rule entry was selected. If a filter rule entry was not selected, control proceeds to function block 1830. If a filter rule entry was selected, control proceeds to function block 1810.

At function block 1810, the system places the contents of the selected filter rule in the List Pane and hence the List Pane FilterRuleTable into the Display Pane FilterRule structure. The Display Pane is redisplayed to show the contents of the new Display Pane FilterRule structure. Control proceeds to function block 1815. At function block 1815, the system sets the Display Action Pane matched filter number to 0 and redisplays the Display Action Pane to show the new Display Action Pane matched filter number value. Control proceeds to function block 1825 where the system clears the Meter Pane matched FilterRuleTable and displays the new Meter Pane matched FilterRuleTable in the Meter Pane. Next, control proceeds to function block 1800.

At decision block 1830, the system tests if the list box in the List Pane was scrolled. If a scrolling action did not occur, control proceeds to function block 1840. If a scrolling action occurred, control proceeds to function block 1835. At function block 1835, the List Pane moves the position cue on the vertical bar in the Meter Pane to match the entries displayed in the List Pane. Control proceeds to function block 1800. At function block 1840, the system has detected an unknown action and does nothing. Control returns to function block 1800.

Figure 16:
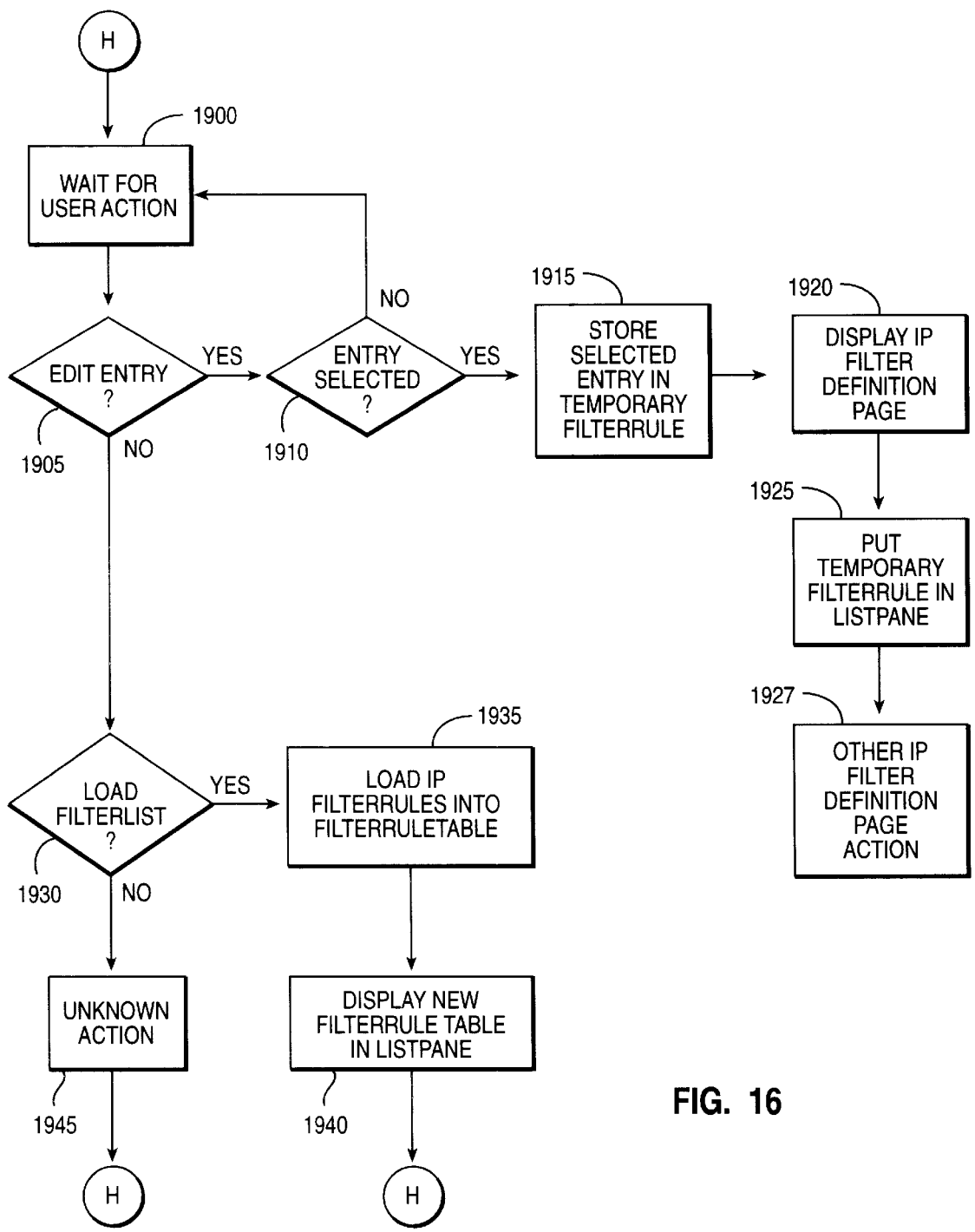
FIG. 16 illustrates the actions in the list action pane in the IP Filter Query Page.

The flow of system actions responsive to user input in the List Action Pane in the IP Filter Query Page are shown in FIG. 16. Flow begins at function block 1900 where the system waits for an action from the administrator. Once the administrator performs an action on the List Action Pane, flow proceeds to decision block 1905. At decision block 1905, the system sees if the Edit Entry Button was pressed. If the Edit Entry Button was not pressed, control proceeds to decision block 1930. If the Edit Entry Button was pressed, control proceeds to decision block 1910.

At decision block 1910, the system finds out whether an entry in the List Pane is selected. If an entry in the List Pane is not selected, control proceeds to function block 1900. If an entry in the List Pane is selected, control proceeds to function block 1915. At function block 1915, the system takes the highlighted or selected entry in the List Pane and stores it in a temporary FilterRule structure. The entire List Pane FilterRuleTable is stored in a temporary FilterRuleTable. Control proceeds to function block 1920 where the List Action Pane displays the IP Filter Definition Page. Control next proceeds to function block 1925 where the temporary FilterRule structure is placed in the Display Pane of the IP Filter Definition Page and the temporary FilterRuleTable is displayed in the List Pane of the IP Filter Definition Page. Control passes to the set of IP Filter Definition Page, actions block 1927.

At decision block 1930, the system checks to see if the Load Filter List Button was pressed. If the Load Filter List Button was not pressed, control proceeds to function block 1945. If the Load Filter List Button was pressed, control proceeds to decision block 1935. At function block 1935, the system loads the set of stored IP filter rules from the firewall and places them into the List Pane FilterRuleTable. The Meter Pane upper bound value is set to the number of rules in the ListPane FilterRuleTable. The Meter Pane matched FilterRuleTable is cleared. The Display Action Pane matched filter number is set to 0. Control proceeds to function block 1940 where the loaded List Pane FilterRuleTable is shown in the List Pane and the Meter Pane and Display Action Pane are redisplayed to show their new backing values. Control proceeds to function block 1900. At function block 1945, the system has detected an unknown action and does nothing. Control returns to function block 1900.

While the description above has been related to IP filtering, i.e. the filter rules promulgated by the various Internet bodies, the invention has application to any set of filter rules which may be imposed between secure and nonsecure networks.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for validating test packets against a set of filter rules for a firewall between a secure computer network and a nonsecure computer network comprising the steps of:

presenting a user interface in which a test packet can be defined, wherein the user interface includes means for defining values for attributes of the test packet, wherein the attributes of the test packet are selected from a set of attributes of normal packets normally sent between the secure and nonsecure computer networks;

responsive to user input, validating a defined test packet against a set of filter rules in the firewall; and responsive to failure of the test packet in the validating step, displaying a filter rule which denied the test packet in the set of filter rules.

2. The method as recited in claim 1, further comprising the step of presenting a list of filter rules from the set of filter rules, wherein the filter rule which denied the test packet is presented in a different manner than other filter rules in the presented list.

3. The method as recited in claim 2, further comprising the step of presenting a graphical bar representing the set of filter rules, wherein a distance that the packet traveled in the set of filter rules is indicated by changing the presentation of the graphical bar at a position representative of the filter rule which denied the test packet.

4. The method as recited in claim 1 further comprising the steps of:

retrieving a plurality of test packets from memory; and running the validating and displaying steps in batch mode.

5. The method as recited in claim 2 further comprising the steps of:

responsive to user input, selecting a filter rule in the presented list; and responsive to user input, performing an action on the selected filter rule.

6. A method for validating test packets against a set of filter rules for a firewall computer between a secure computer network and a nonsecure computer network, comprising the steps of:

presenting a user interface in which a test packet can be defined, wherein the user interface includes means for defining values for attributes of the test packet, wherein the attributes of the test packet are selected from a set of attributes of normal packets normally sent between the secure and nonsecure computer networks;

responsive to user input, running a query on a test packet to determine whether any filter rules share attributes with the test packet;

displaying results of the query in a scatter bar representing a set of filter rules, wherein locations of matching filter rules are indicated by lines through the scatter bar; and responsive to user input, performing an action on a selected filter rule.

7. The method as recited in claim 6 further comprising the steps of:

displaying a list of filter rules, wherein the matching filter rules are displayed in a different manner than non-matching filter rules; and displaying a small bar proximate to the scatter bar, the small bar indicating a portion of the set of filter rules displayed as the list of filter rules relative to a complete list of tunnel definitions represented by the scatter bar.

8. A system including processor and memory for validating test packets against a set of filter rules for a firewall between a secure computer network and a nonsecure computer network comprising:

means for presenting a user interface in which a test packet can be defined, wherein the user interface includes means for defining values for attributes of the test packet, wherein the attributes of the test packet are selected from a set of attributes of normal packets normally sent between the secure and nonsecure computer networks;

means responsive to user input for validating a defined test packet against a set of filter rules in the firewall; and means responsive to failure of the test packet in the validating step for displaying a filter rule which denied the test packet in the set of filter rules.

9. The system as recited in claim 8, further comprising means for presenting a list of filter rules from the set of filter rules, wherein the filter rule which denied the test packet is presented in a different manner than other filter rules in the presented list.

10. The system as recited in claim 9, further comprising means for presenting a graphical bar representing the set of filter rules, wherein a distance that the packet traveled in the set of filter rules is indicated by changing the presentation of the graphical bar at a position representative of the filter rule which denied the test packet.

11. The system as recited in claim 6 further comprising the steps of:
means for retrieving a plurality of test packets from memory; and
means for running the validating and displaying steps in batch mode.

12. The system as recited in claim 7 further comprising:
means responsive to user input for selecting a filter rule in the presented list; and
means responsive to user input for performing an action on the selected filter rule.

13. A system including processor and memory for validating test packets against a set of filtering for a firewall computer between a secure computer network and a nonsecure computer network, comprising:
means for presenting a user interface in which a test packet can be defined, wherein the user interface includes means for defining values for attributes of the test packet, wherein the attributes of the test packet are selected from a set of attributes of normal packets normally sent between the secure and nonsecure computer networks;
means responsive to user input for running a query on a test packet to determine whether any filter rules share attributes with the test packet;
means for displaying results of the query in a scatter bar representing a set of filter rules, wherein locations of matching filter rules are indicated by lines through the scatter bar; and
means responsive to user input for performing an action on a selected filter rule.

14. The system as recited in claim 13 further comprising:
means for displaying a list of filter rules, wherein the matching filter rules are displayed in a different manner than nomatching filter rules; and
means for displaying a small bar proximate to the scatter bar, the small bar indicating a portion of the set of filter rules displayed as the list of filter rules relative to a complete list of tunnel definitions represented by the scatter bar.

15. A computer program product in a computer readable medium for validating test packets against a set of filter rules on a firewall between a secure computer network and a nonsecure computer network comprising:
means for presenting a user interface in which a test packet can be defined, wherein the user interface includes means for defining values for attributes of the test packet, wherein the attributes of the test packet are selected from a set of attributes of normal packets normally sent between the secure and nonsecure computer networks;
means for responsive to user input for validating a defined test packet against a set of filter rules in the firewall; and
means responsive to failure of the test packet in the validating step for displaying a filter rule in the set of filter rules which denied the test packet.

16. The product as recited in claim 15, further comprising presenting a list of filter rules from the set of filter rules, wherein the filter rule which denied the test packet is presented in a different manner than other filter rules in the presented list.

17. The product as recited in claim 16, further comprising means for presenting a graphical bar representing the set of filter rules, wherein a distance that the packet traveled in the set of filter rules is indicated by changing the presentation of the graphical bar at a position representative of the filter rule which denied the test packet.

18. The product as recited in claim 15 further comprising;
means for retrieving a plurality of test packets from memory; and
means for running the validating and displaying steps in batch mode.

19. The product as recited in claim 16 further comprising:
means responsive to user input for selecting a filter rule it the presented list; and
means responsive to user input for performing an action on the selected filter rule.

20. A computer program product in a computer readable medium for validating test packets against a set of filter rules for a firewall computer between a secure computer network and a nonsecure computer network, comprising:
means for presenting a user interface in which a test packet can be defined, wherein the user interface includes means for defining values for attributes of the test packet, wherein the attributes of the test packet are selected from a set of attributes of normal packets normally sent between the secure and nonsecure computer networks;
means for responsive to user input for running a query on a test packet to determine whether any filter rules share attributes with the test packet;
means displaying results of the query in a scatter bar representing a set of filter rules, wherein locations of matching filter rules are indicated by lines through the scatter bar; and
means responsive to user input for performing an action on a selected filter rule.

21. The product as recited in claim 20 further comprising:
means for displaying a list of filter rules, wherein the matching filter rules are displayed in a different manner than nonmatching filter rules; and
means for displaying a small bar proximate to the scatter bar, the small bar indicating a portion of the set of filter rules displayed as the list of filter rules relative to a complete list of tunnel definitions represented by the scatter bar.

22. A method for validating test packets against a set filter rules for a firewall between a secure computer network and a nonsecure computer network comprising the steps of:
presenting a user interface in which a test packet can be defined, wherein the user interface includes means for defining values for attributes of the test packet, wherein the attributes of the test packet are selected from a set of attributes of normal packets normally sent between the secure and nonsecure computer networks;
responsive to user input, validating a defined test packet against a set of filter rules in the firewall; and
responsive to failure of the test packet in the validating step, displaying a subset of filter rules which passed the packet and a filter rule which denied the test packet.

23. The method as recited in claim 22 wherein the displaying step shows a graphical display of the filter rule which denied the test packet and the subset of filter rules through which the packet passed.

24. The method as recited in claim 22 wherein a test packet can be incompletely defined.

25. A method for validating test packets against a set of filtering for a firewall computer between a secure computer network and a nonsecure computer network, comprising the steps of:

presenting a user interface in which a test packet can be defined, wherein the user interface includes means for defining values for attributes of the test packet, wherein the attributes of the test packet are selected from a set of attributes of normal packets normally sent between the secure and nonsecure computer networks;

responsive to user input, running a query on a test packet to determine whether which ones of a set of filter rules share attributes with the test packet; and displaying results of the query showing matching filter rules in a different manner from nonmatching filter rules.

26. The method as recited in claim 25 wherein the displaying step presents a graphical display of the set of filter rules, wherein representations of matching filter rules are presented in a different manner than nonmatching filter rules.

27. The method as recited in claim 26 wherein the set of filter rules is presented as a list of filter rules wherein matching filter rules are presented in a different manner than nonmatching filter rules and the method further comprises the step of responsive to user selection of a filter rule in the list, performing an action on the selected filter rule.

* * * * *